US006760817B2

(12) United States Patent
Arimilli et al.

(10) Patent No.: US 6,760,817 B2
(45) Date of Patent: Jul. 6, 2004

(54) METHOD AND SYSTEM FOR PREFETCHING UTILIZING MEMORY INITIATED PREFETCH WRITE OPERATIONS

(75) Inventors: Ravi Kumar Arimilli, Austin, TX (US); John Steven Dodson, Pflugerville, TX (US); James Stephen Fields, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 09/886,004

(22) Filed: Jun. 21, 2001

(65) Prior Publication Data

US 2003/0009632 A1 Jan. 9, 2003

(51) Int. Cl.[7] ............................................. G06F 12/00
(52) U.S. Cl. ...................... 711/137; 711/119; 711/146
(58) Field of Search ................................ 711/137, 119, 711/146

(56) References Cited

U.S. PATENT DOCUMENTS

| 5,247,639 A | | 9/1993 | Yamahata |
|---|---|---|---|
| 5,303,362 A | | 4/1994 | Butts et al. |
| 5,325,504 A | | 6/1994 | Tipley et al. |
| 5,353,428 A | | 10/1994 | Shibata |
| 5,566,315 A | | 10/1996 | Milillo et al. |
| 5,680,576 A | | 10/1997 | Laudon |
| 5,727,150 A | | 3/1998 | Laudon et al. |
| 5,737,565 A | | 4/1998 | Mayfield |
| 5,761,721 A | | 6/1998 | Baldus et al. |
| 5,787,476 A | | 7/1998 | Laudon et al. |
| 5,829,032 A | | 10/1998 | Komuro et al. |
| 5,881,303 A | * | 3/1999 | Hagersten et al. ............ 712/30 |
| 5,893,922 A | | 4/1999 | Baylor et al. |
| 6,134,619 A | * | 10/2000 | Futral et al. ................ 710/112 |
| 6,195,728 B1 | | 2/2001 | Bordaz et al. |
| 6,209,068 B1 | | 3/2001 | Hill et al. |
| 6,286,090 B1 | | 9/2001 | Steely, Jr. et al. |
| 6,332,169 B1 | | 12/2001 | Hagersten |
| 6,349,366 B1 | | 2/2002 | Razdan et al. |
| 6,374,329 B1 | * | 4/2002 | McKinney et al. ......... 711/141 |
| 6,381,681 B1 | | 4/2002 | McCracken et al. |
| 6,397,302 B1 | | 5/2002 | Razdan et al. |
| 6,408,313 B1 | | 6/2002 | Campbell et al. |
| 6,449,700 B2 | | 9/2002 | Hagersten et al. |

OTHER PUBLICATIONS

Skeppstedt et al. "Overcoming Limitations of Prefetching in Multiprocessors by Compiler–Initiated Coherence Action" 1997 Parallel Architectures and Compilation Techniques p. 272–283.*

(List continued on next page.)

Primary Examiner—Mano Padmanabhan
Assistant Examiner—Paul A Baker
(74) Attorney, Agent, or Firm—Casimer K. Salys; Bracewell & Patterson, L.L.P.

(57) ABSTRACT

A computer system includes a processing unit, a system memory, and a memory controller coupled to the processing unit and the system memory. According to the present invention, the memory controller accesses the system memory to obtain prefetch data and transmits the prefetch data to the processing unit in a prefetch write operation specifying the processing unit in a destination field. In one embodiment, the memory controller transmits the prefetch write operation in response to receipt of a prefetch hint from the processing unit, which may accompany a read-type request by the processing unit. This prefetch methodology may advantageously be implemented imprecisely, with the memory controller responding to the prefetch hint only if a prefetch queue is available and ignoring the prefetch hint otherwise. The processing unit may similarly ignore the prefetch write operation if no snoop queue is available. Consequently, communication bandwidth is not wasted by the memory controller or processing unit retrying prefetch operations. In addition, because the memory controller directs prefetching, the processing unit need not allocate a queue to the prefetch operation, thus reducing the number of queues required in the processing unit.

22 Claims, 15 Drawing Sheets

OTHER PUBLICATIONS

Mowry "Tolerating Latency in Multiprocessors through Complier–Inserted Prefetching" Feb. 1998, ACM Trans Computer Systems v16, n1, p. 55–92.*

Lai et al., "Data Prefetching for Distributed Shared Memory Systems" 1996 Proc $29^{th}$ Annual Hawaii Inter. Conf. on System Sciences p. 102–110.*

Culler et al. "Parallel Computer Architecture", 1999, Morgan Kaufmann Publishing, 393–397, 553–571.

Nikolopoulos, Dimitrios S., et al., *A Case for User–Level Dynamic Page Migration*, 2000, Sante Fe, New Mexico.

Wilson, Kenneth M., et al., *Dynamic Page Placement to Improve Locality in CC–NUMA Multiprocessors for TPC–C*, Nov. 2001, Denver.

Soundararajan, V., et al., *Flexible Use of Memory for Replication/Migration in Cache–Coherent DSM Multiprocessors*.

Zhang, X., et al., *Modeling Data Migration on CC–NUMA and CC–COMA Hierarchical Ring Architectures*, IEEE Computer, 1994, pp. 159–163.

Atty Docket No. AUS9–00–893US1, Related Copending Application Ravi Kumar Arimilli, et al., Appln. Filed Jun. 21, 2001.

Atty Docket No. AUS9–00–894US1, Related Copending Application Ravi Kumar Arimilli, et al., Appln. Filed Jun. 21, 2001.

Atty Docket No. AUS9–00–895US1, Related Copending Application Ravi Kumar Arimilli, et al., Appln. Filed Jun. 21, 2001.

Atty Docket No. AUS9–00–896US1, Related Copending Application Ravi Kumar Arimilli, et al., Appln. Filed Jun. 21, 2001.

Atty Docket No. AUS9–00–897US1, Related Copending Application Ravi Kumar Arimilli, et al., Appln. Filed Jun. 21, 2001.

Atty Docket No. AUS9–00–899US1, Related Copending Application Ravi Kumar Arimilli, et al., Appln. Filed Jun. 21, 2001.

Atty Docket No. AUS9–00–900US1, Related Copending Application Ravi KUmar Arimilli, et al., Appln. Filed Jun. 21, 2001.

Atty Docket No. AUS9–00–902US1, Related Copending Application Ravi Kumar Arimilli, et al., Appln. Filed Jun. 21, 2001.

* cited by examiner

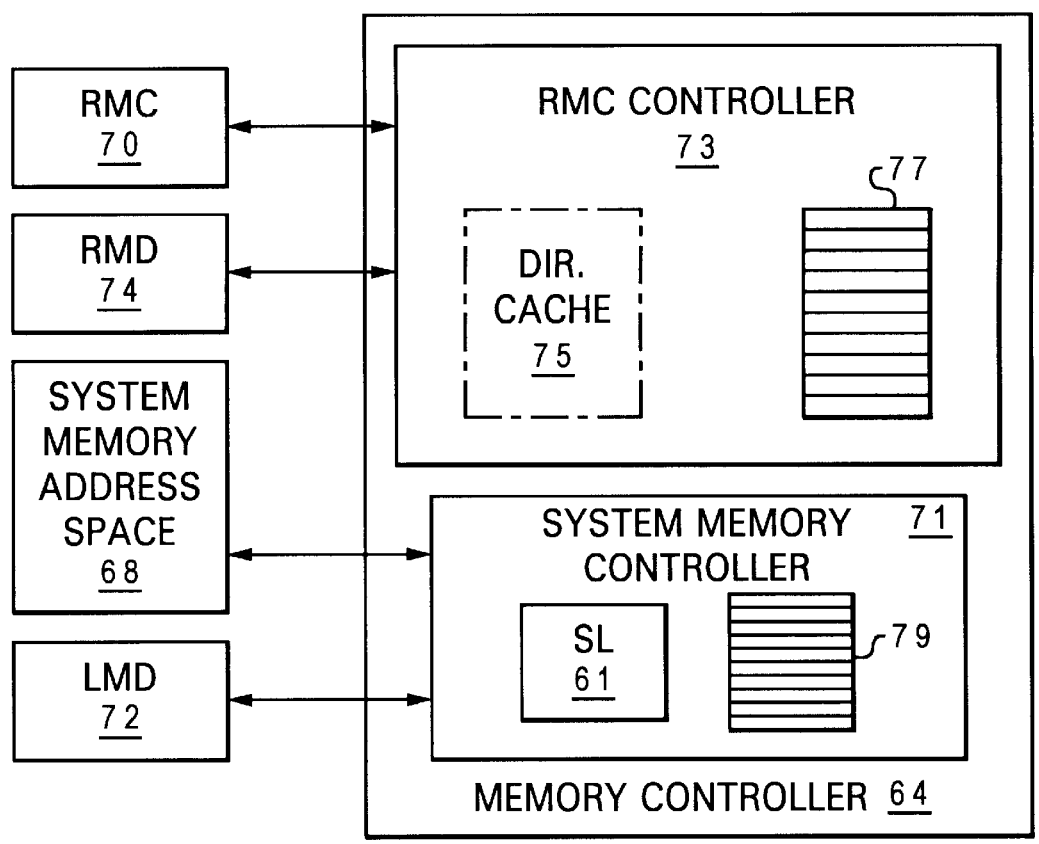
Fig. 3
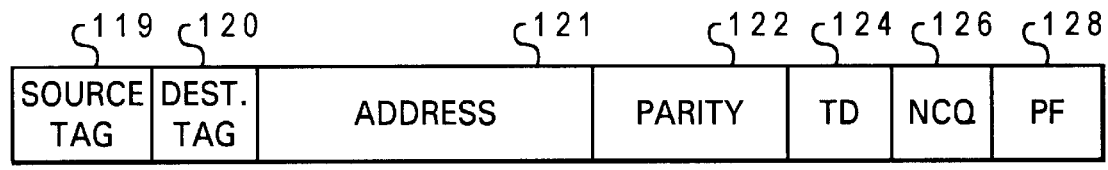
Fig. 6
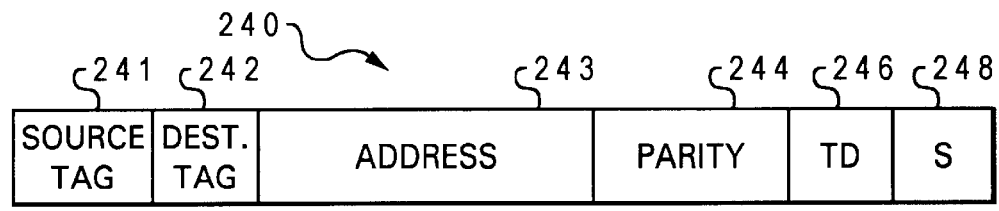
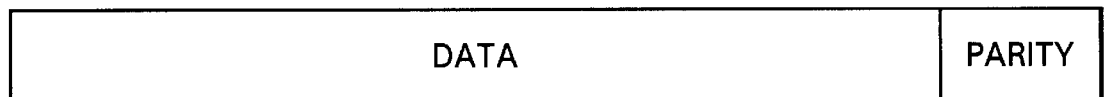
Fig. 9

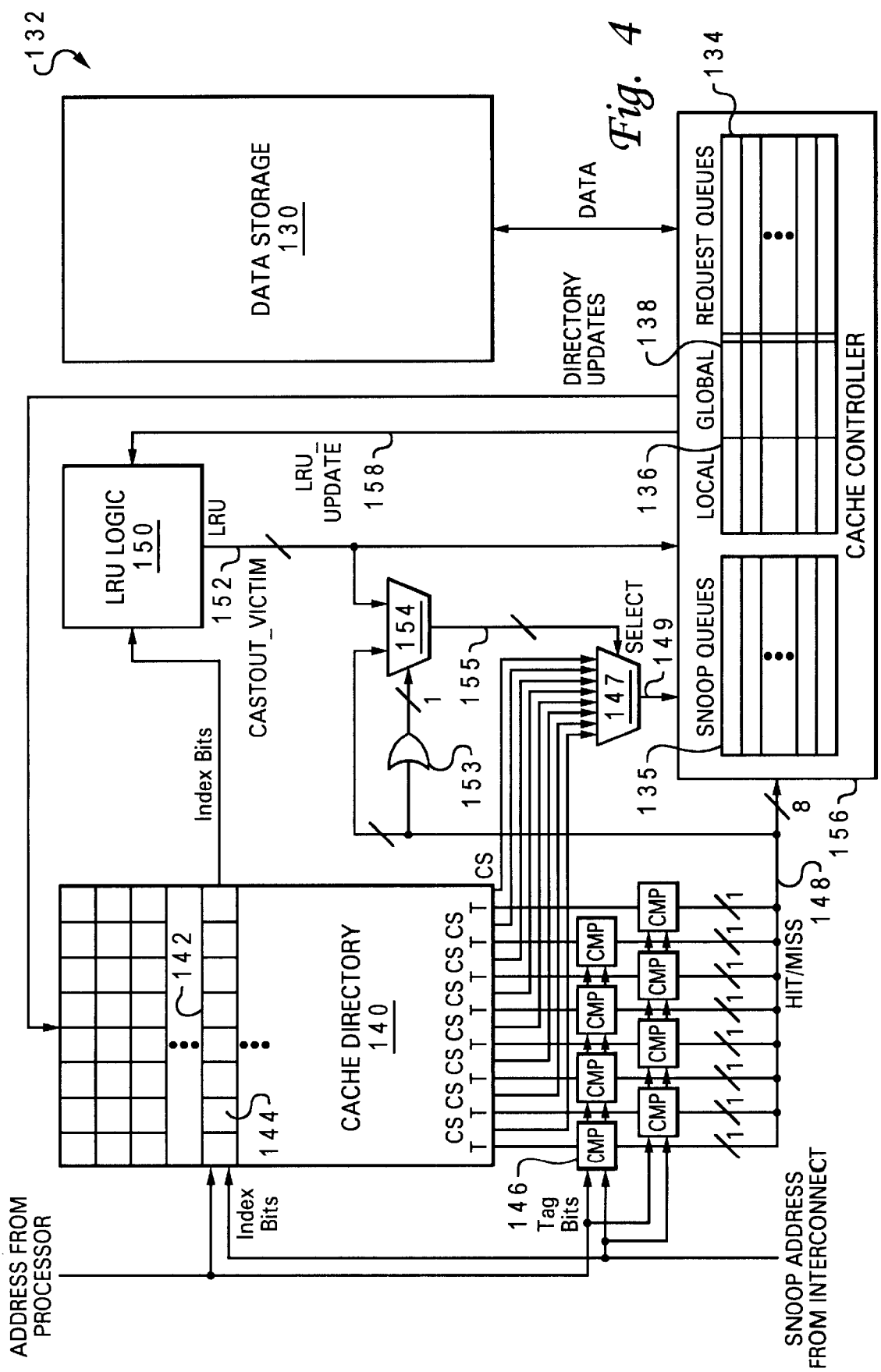

METHOD AND SYSTEM FOR PREFETCHING UTILIZING MEMORY INITIATED PREFETCH WRITE OPERATIONS

CROSS-REFERENCE TO RELATED APPLICATIONS

The present application is related to the following co-pending applications, which are filed of even date herewith, assigned to the assignee of the present application and incorporated herein by reference:

(1) U.S. patent application Ser. No. 09/885,992;
(2) U.S. patent application Ser. No. 09/885,990;
(3) U.S. patent application Ser. No. 09/885,996;
(4) U.S. patent application Ser. No. 09/885,994;
(5) U.S. patent application Ser. No. 09/886,000;
(6) U.S. patent application Ser. No. 09/885,991;
(7) U.S. patent application Ser. No. 09/885,998; and
(8) U.S. patent application Ser. No. 09/885,999.

BACKGROUND OF THE INVENTION

1. Technical Field

The present invention relates in general to data processing systems and, in particular, to non-uniform memory access (NUMA) and other multiprocessor data processing systems having improved queuing, communication and/or storage efficiency.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One common MP computer topology is a symmetric multi-processor (SMP) configuration in which each of multiple processors shares a common pool of resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems are also not easily expandable. For example, a user typically cannot purchase an SMP computer system having two or four processors, and later, when processing demands increase, expand the system to eight or sixteen processors.

As a result, an MP computer system topology known as non-uniform memory access (NUMA) has emerged to addresses the limitations to the scalability and expandability of SMP computer systems. As illustrated in FIG. 1, a conventional NUMA computer system 8 includes a number of nodes 10 connected by a switch 12. Each node 10, which can be implemented as an SMP system, includes a local interconnect 11 to which number of processing units 14 are coupled. Processing units 14 each contain a central processing unit (CPU) 16 and associated cache hierarchy 18. At the lowest level of the volatile memory hierarchy, nodes 10 further contain a system memory 22, which may be centralized within each node 10 or distributed among processing units 14 as shown. CPUs 16 access memory 22 through a memory controller 20.

Each node 10 further includes a respective node controller 24, which maintains data coherency and facilitates the communication of requests and responses between nodes 10 via switch 12. Each node controller 24 has an associated local memory directory (LMD) 26 that identifies the data from local system memory 22 that are cached in other nodes 10, a remote memory cache (RMC) 28 that temporarily caches data retrieved from remote system memories, and a remote memory directory (RMD) 30 providing a directory of the contents of RMC 28.

The present invention recognizes that, while the conventional NUMA architecture illustrated in FIG. 1 can provide improved scalability and expandability over conventional SMP architectures, the conventional NUMA architecture is subject to a number of drawbacks. First, communication between nodes is subject to much higher latency (e.g., five to ten times higher latency) than communication over local interconnects 11, meaning that any reduction in inter-node communication will tend to improve performance. Consequently, it is desirable to implement a large remote memory cache 28 to limit the number of data access requests that must be communicated between nodes 10. However, the conventional implementation of RMC 28 in static random access memory (SRAM) is expensive and limits the size of RMC 28 for practical implementations. As a result, each node is capable of caching only a limited amount of data from other nodes, thus necessitating frequent high latency inter-node data requests.

A second drawback of conventional NUMA computer systems related to inter-node communication latency is the delay in servicing requests caused by unnecessary inter-node coherency communication. For example, prior art NUMA computer systems such as that illustrated in FIG. 1 typically allow remote nodes to silently deallocate unmodified cache lines. In other words, caches in the remote nodes can deallocate shared or invalid cache lines retrieved from another node without notifying the home node's local memory directory at the node from which the cache line was "checked out." Thus, the home node's local memory directory maintains only an imprecise indication of which remote nodes hold cache lines from the associated system memory. As a result, when a store request is received at a node, the node must broadcast a Flush (i.e., invalidate) operation to all other nodes indicated in the home node's local memory directory as holding the target cache line regardless of whether or not the other nodes still cache a copy of the target cache line. In some operating scenarios, unnecessary flush operations can delay servicing store requests, which adversely impacts system performance.

Third, conventional NUMA computer systems, such as NUMA computer system 8, tend to implement deep queues within the various node controllers, memory controllers, and cache controllers distributed throughout the system to allow for the long latencies to which inter-node communication is subject. Although the implementation of each individual queue is inexpensive, the deep queues implemented throughout conventional NUMA computer systems represent a significant component of overall system cost. The present invention therefore recognizes that it would advantageous to reduce the pendency of operations in the queues of NUMA computer systems and otherwise improve queue utilization so that queue depth, and thus system cost, can be reduced.

In view of the foregoing and additional drawbacks to conventional NUMA computer systems, the present invention recognizes that it would be useful and desirable to provide a NUMA architecture having improved queuing, storage and/or communication efficiency.

SUMMARY OF THE INVENTION

The present invention overcomes the foregoing and additional shortcomings in the prior art by providing a computer system and associated method of operation that provide support prefetching through memory-initiated write operations.

A computer system includes a processing unit, a system memory, and a memory controller coupled to the processing unit and the system memory. According to the present invention, the memory controller accesses the system memory to obtain prefetch data and transmits the prefetch data to the processing unit in a prefetch write operation specifying the processing unit in a destination field. In one embodiment, the memory controller transmits the prefetch write operation in response to receipt of a prefetch hint from the processing unit, which may accompany a read-type request by the processing unit. This prefetch methodology may advantageously be implemented imprecisely, with the memory controller responding to the prefetch hint only if a prefetch queue is available and ignoring the prefetch hint otherwise. The processing unit may similarly ignore the prefetch write operation if no snoop queue is available. Consequently, communication bandwidth is not wasted by the memory controller or processing unit retrying prefetch operations. In addition, because the memory controller directs prefetching, the processing unit need not allocate a queue to the prefetch operation, thus reducing the number of queues required in the processing unit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a more detailed block diagram of a memory controller within the NUMA computer system of FIG. 2A or 2B;

FIG. 4 is a more detailed block diagram of a lower level cache in the NUMA computer system of FIG. 2A or 2B;

FIG. 6 illustrates an exemplary read-type request in accordance with the present invention;

FIG. 9 illustrates an exemplary castout write operation that may be employed in the method of FIG. 8;

DETAILED DESCRIPTION OF ILLUSTRATIVE EMBODIMENT

System Overview

Figure 2A:
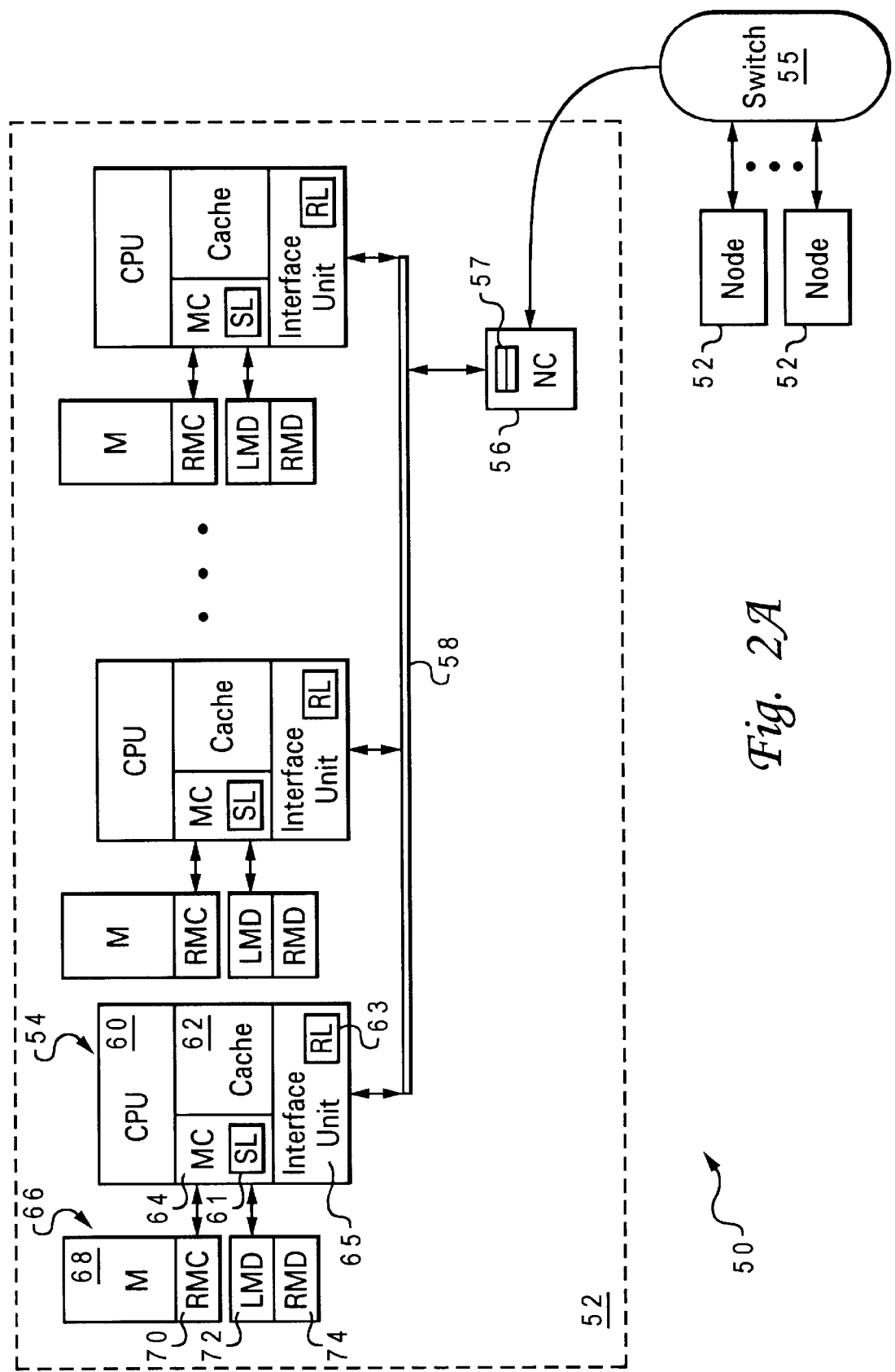
FIG. 2A illustrates an exemplary embodiment of a NUMA computer system in accordance with the present invention, which has a remote memory cache (RMC) incorporated within a system memory.

With reference again to the figures and in particular with reference to FIG. 2A, there is depicted an exemplary embodiment of a NUMA computer system 50 in accordance with the present invention. The depicted embodiment can be realized, for example, as a workstation, server, or mainframe computer. Although the present invention is principally described below with reference to NUMA computer system 50, those skilled in the art will appreciate that many of the features of the present invention are also applicable to other computer system architectures, including SMP architectures.

As illustrated, NUMA computer system 50 includes two or more nodes 52 coupled by a node interconnect 55, which, as shown, may be implemented as a switch. Although not required by the present invention, in the illustrated embodiment each of nodes 52 is substantially identical, with each node including one or more processing units 54 coupled to a local interconnect 58 and a node controller 56 coupled between local interconnect 58 and node interconnect 55. Each node controller 56 serves as a local agent for other nodes 52 by transmitting selected operations received on local interconnect 58 to other nodes 52 via node interconnect 55 and by transmitting selected operations received via node interconnect 55 on local interconnect 58.

Processing units 54 include a CPU 60 having registers, instruction flow logic and execution units utilized to execute software instructions. Each processing unit 54 further includes a cache hierarchy 62 including one or more levels of on-chip cache utilized to stage data to the associated CPU 60 from data storage throughout NUMA computer system 50. A suitable cache architecture that maybe employed within cache hierarchies 62 is described below with reference to FIG. 4. In addition, processing units 54 each have an interface unit 65 that handles the communication of addresses, data and coherency operations between processing unit 54 and local interconnect 58 and, as discussed further below, includes response logic 63 that determines a combined response to an operation issued on local interconnect 58 from the various snoop responses to the operation. Finally, processing units 54 each contain a memory controller 64 that controls access to an associated one of the physical system memories 66 distributed among processing units 54. In alternative embodiments of the present invention, system memory, if any, in each node may be implemented as a single system memory controlled by an associated memory controller coupled to local interconnect 58.

In the present specification, "system memory" is defined as a physical data storage device addressed utilizing unique addresses that (absent an error condition) are permanently associated with respective storage locations in the physical data storage device. The node 52 that stores a datum at a storage location in its system memory 66 associated with an address utilized to uniquely identify the datum throughout NUMA computer system 50 is defined to be the home node for that datum; conversely, others of nodes 52 are defined to be remote nodes with respect to the datum.

As depicted in FIG. 2A and also in FIG. 3, to support data sharing between nodes 52, memory controllers 64 employ a local memory directory (LMD) 72 and a remote memory cache (RMC) 70 having an associated remote memory directory (RMD) 74. As utilized herein, a local memory directory (LMD) is defined as a directory that, for data resident in an associated system memory, stores an indication regarding whether the data are cached in one or more remote nodes. Conversely, a remote memory directory (RMD) is defined as a directory that indicates which data from system memory in other node(s) are cached in the associated remote memory cache (RMC). For convenience, the circuitry of a memory controller 64 that controls access to home node data within an associated system memory 66 is referred to herein as a system memory controller 71, and the circuitry of a memory controller 64 that controls access to RMC 70 is referred to as a RMC controller 73.

Of course, NUMA computer system 50 can further include additional devices that are not necessary for an understanding of the present invention and are accordingly omitted in order to avoid obscuring the present invention. For example, any of nodes 52 may also support I/O and network adapters, non-volatile storage for storing an operating system and application software, and serial and parallel ports for connection to networks or attached devices.

Memory Organization

Performance of NUMA computer system 50 is influenced, among other things, by data access latencies. Because the access latency for intra-node data requests is typically much less than that for inter-node data requests, system performance is generally improved if each node 52 containing a processing unit 54 is equipped with a large data storage capacity, thus minimizing inter-node data requests. For example, in an exemplary embodiment in which NUMA computer system 50 includes four nodes that each contain four processing units 54 and four system memories 66, each of the four system memories 66 may have a capacity of 8 gigabytes (GB) or more, giving a total system memory storage capacity of 128 GB or more. Because of the large capacity of system memory, cost considerations would generally dictate the implementation of system memories 66 in a storage technology having low per-byte cost, such as dynamic random access memory (DRAM).

Figure 1:
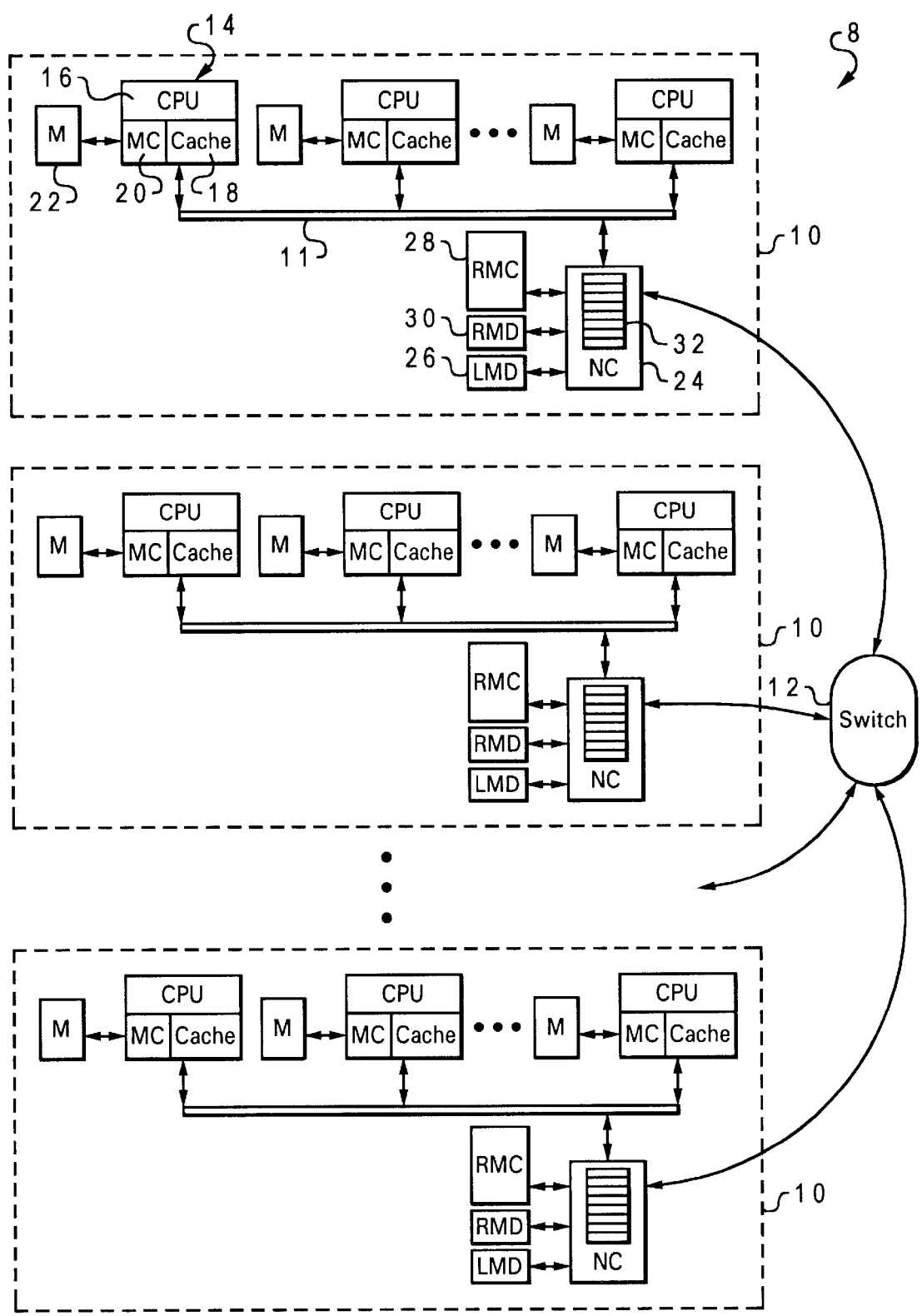
FIG. 1 is a block diagram of a NUMA computer system in accordance with the prior art.

In accordance with the present invention, the storage capacity of system memories 66 maybe partitioned (e.g., by the operating system of NUMA computer system 50) into one or more address spaces. In the embodiment shown in FIG. 2A, each system memory 66 includes a system memory address space 68 that is allocated by the operating system of NUMA computer system 50 to various operating system and application processes for storage of instructions and data. In addition, at least one system memory 66 in each node 52 containing a processor unit 54 contains a RMC 70 for storing data corresponding to that residing in the system memories 66 of one or more other nodes 52. Thus, in lieu of implementing a single stand-alone remote memory cache 28 as shown in FIG. 1, the present invention incorporates remote memory cache for each node 52 within one and possibly multiple system memories 66. In embodiments in which RMC 70 is distributed among multiple system memories 66, the cache lines, which are accessible to at least any CPU 60 in the same node 52, are preferably mapped to particular RMCs 70 by hashing the physical or logical addresses associated with the cache lines.

Because the remote memory cache is implemented in low cost DRAM rather than expensive SRAM, the per-byte cost of RMC 70 is dramatically reduced as compared with the prior art, meaning that its size can be greatly increased with little or no additional cost. In addition, by distributing the remote memory cache among multiple system memories in the same node, significant bandwidth improvement is achieved over the prior art by distributing access control across multiple memory controllers 64 rather than a single node controller.

It should be noted that in some embodiments of the present invention, the operating system may choose to allocate some or all of the physical system memory in one or more nodes to the remote memory cache and none of physical system memory to system memory address space. In such embodiments, the system memory address space may be localized in one or more nodes implemented, for example, as disk memory drawers in a rack system, while the physical system memory in other nodes containing processing units is allocated as remote memory cache.

As noted above, each memory controller 64 associated with a system memory 66 allocated to hold at least a portion of RMC 70 is provided with a RMD 74 in which the memory controller 64 records the contents of its associated portion of RMC 70. As with conventional cache directories, RMD 74 preferably stores not only address information related to the data in RMC 70, but also coherency information, replacement information, and optionally additional state information (e.g., inclusivity).

To support rapid access by memory controller 64 to RMD 74, RMD 74 may be implemented in high speed SRAM as depicted in FIG. 2A. This implementation advantageously reduces access latency by promoting rapid directory lookups in response to requests. However, as with RMC 70, use of SRAM for RMD 74 is expensive and limits the size of RMD 74 (and hence RMC 70) for practical systems. Two different approaches may be employed to address such concerns.

Figure 2B:
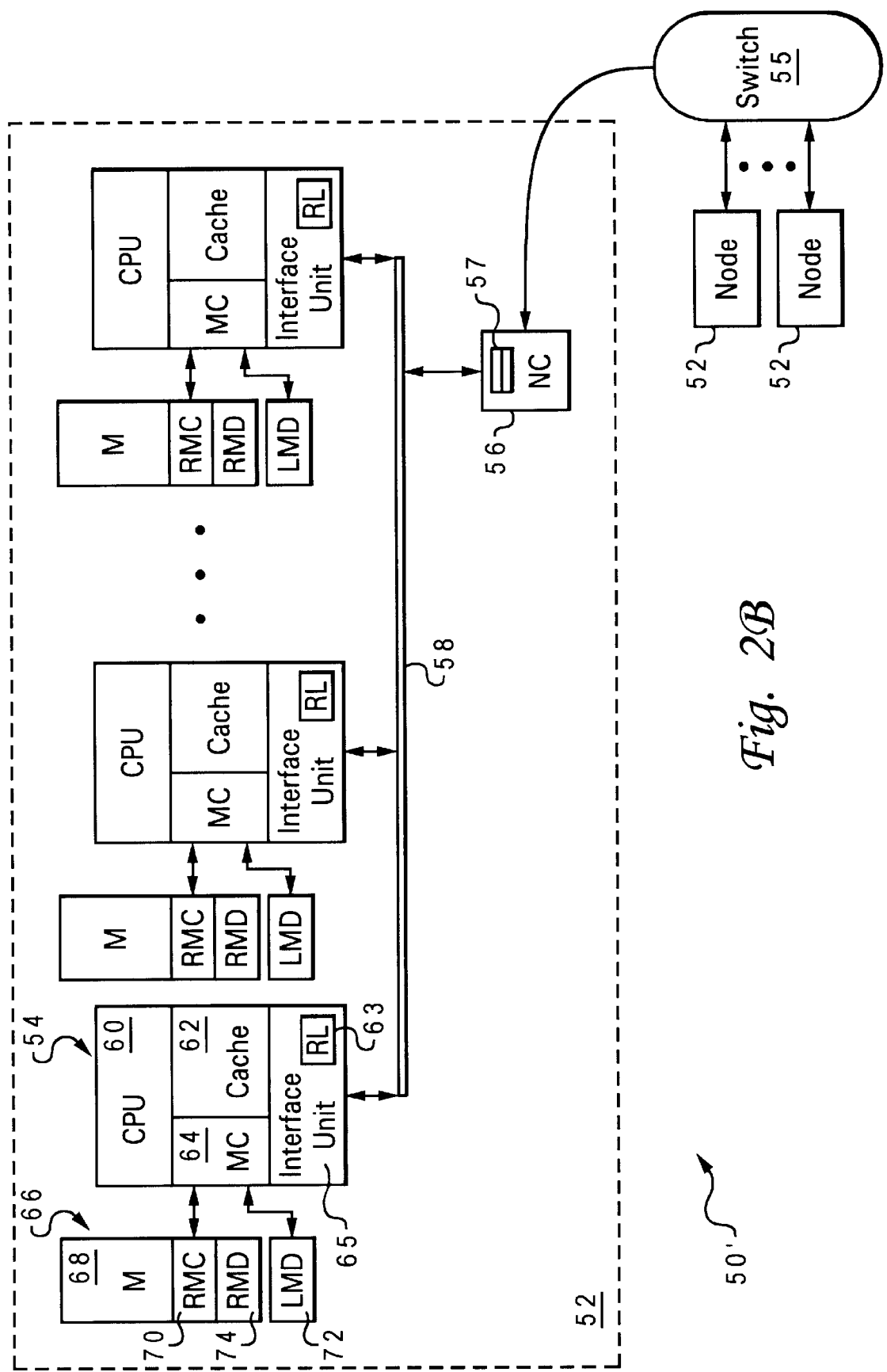
FIG. 2B depicts an exemplary embodiment of a NUMA computer system in accordance with the present invention, which has a remote memory cache (RMC) and associated remote memory directory (RMD) incorporated within a system memory.

First, if RMD 74 is implemented in SRAM (or other high cost storage technology), RMD 74 can implement large sectors (i.e., associate large data blocks with each set of tag and state information) so that use of the SRAM storage capacity is optimized. A second approach, exemplified by NUMA computer system 50' of FIG. 2B, is to incorporate RMD 74 into system memory 66 together with RMC 70. In this manner, the cost of implementing RMD 74 can be greatly reduced, or the size of RMD 74 and RMC 70 can be greatly increased without additional cost. Although the incorporation of RMD 74 within the DRAMs of system memory 66 can lead to slower directory access times, this additional directory access latency can be mitigated by equipping RMC controller 73 with a small directory cache 75 containing recently accessed (and therefore likely to be accessed) directory entries, as shown in FIG. 3.

The amount of system memory 66 allocated to RMD 74 and/or RMC 70 by the operating system of NUMA computer system 50 is an important performance consideration since allocating larger RMCs 70 and RMDs 74 necessarily reduces system memory address space 68. In a preferred embodiment, the proportion of system memory 66 allocated to RMC 70 and RMD 74 versus system memory address space 68 can be varied dynamically depending on the needs of the application to be run. For example, if the operating system detects that an application will only need to access the memory within the node 52 in which the application is to be run, the operating system can allocate RMC 70 (and its associated RMD 74) a fairly small space compared with system memory address space 68. Conversely, if the operating system detects that an application will require substantial access to remote memory, the operating system may allocate a larger portion of the system memory to RMC 70 (and its associated RMD 74).

RMCs 70 (and RMDs 74) can be populated according to at least two alternative methods. First, RMCs 70 can be implemented as inclusive (or pseudo-inclusive) caches that collectively store a superset of the data from other nodes held in the local cache hierarchies 62. In this embodiment, cache lines are loaded into the RMCs 70 of a node 52 when requested cache lines are received from other nodes 52. Alternatively, RMCs 70 can be implemented as "victim caches" that only hold cache lines of remote data in a shared or modified coherency state that have been deallocated from local cache hierarchies 62.

Memory Coherency

Because data stored within each system memory 66 can generally be requested, accessed, and modified by any CPU 60 within NUMA computer system 50, NUMA computer system 50 (or 50') implements one or more compatible cache coherency protocols to maintain coherency (i.e., a coherent view of the aggregate contents of system memory address space 68) between cache hierarchies 62 and RMC 70 in nodes 52. Thus, NUMA computer system 50 is properly classified as a CC-NUMA computer system. The cache coherence protocol is implementation-dependent and may comprise, for example, the well-known Modified, Exclusive, Shared, Invalid (MESI) protocol or a variant thereof. As will be understood by those skilled in the art, the coherency protocol(s) utilized by cache hierarchies 62 necessitate the transmission of various implementation-dependent messages across local interconnect 58 and node interconnect 55 to inform cache hierarchies 62 of operations performed by CPUs 60, to obtain needed data and instructions, to writeback modified data to system memories 66, and to perform other functions needed to maintain coherency.

To maintain coherency between nodes, system memory controllers 71 store indications within LMD 72 of the system memory addresses of data (i.e., cache lines) checked out to remote nodes 52 from the associated system memory address space 68. In low-end implementations in which maintaining a compact directory is important, LMD 72 may have associated with each data granule only an imprecise indication of whether the data granule is "checked out" to at least one remote node 52. Alternatively, in high-end implementations, LMD 72 preferably stores, in association with each data granule, an indication of the coherency state of the cache line at each remote node 52. Per-node coherency states contained in entries of LMD 72 according to an exemplary embodiment of the present invention include those summarized in Table I.

TABLE I

| Coherence directory state | Possible state(s) in local cache | Possible state(s) in remote cache | Meaning |
| --- | --- | --- | --- |
| Modified (M) | I | M, E, or I | Cache line may be modified at a remote node with respect to system memory at home node |
| Shared (S) | S or I | S or I | Cache line may be held non-exclusively at remote node |
| Invalid (I) | M, E, S, or I | I | Cache line is not held by any remote node |

As indicated in Table I, even in high-end implementations, the knowledge of the coherency states of cache lines held by remote processing nodes can be specified with some degree of imprecision. As discussed below with respect to FIGS. 7 and 8, the degree of imprecision depends upon whether the implementation of the coherency protocol permits a cache line held remotely to make a transition from S to I, from E to I, or from E to M without notifying the LMD 72 at the home node.

In a preferred embodiment of the present invention, LMD 72 is implemented in high speed SRAM, as shown in FIGS. 2A and 2B. It should be noted, however, that LMD 72 could alternatively be incorporated within system memory 66 together with RMC 70 and/or RMD 74. However, there is less motivation for incorporating LMD 72 into system memory 66 because doing so does not decrease average remote memory access latency by facilitating a larger RMC 70 and RMD 74. Moreover, incorporating LMD 72 into system memory 66 would nearly double access time to system memory 66 because one access time would be required to lookup LMD 72 and a second equivalent access time would be required to obtain the requested data from system memory address space 68.

Cache Organization

Referring now to FIG. 4, there is illustrated a block diagram of an exemplary lower level cache 132 that may be implemented within cache hierarchies 62. Other higher level caches within cache hierarchies 62 may be similarly constructed.

As shown, cache 132 includes data storage 130, a cache directory 140 and a cache controller 156. Data storage 130 is preferably implemented as a set associative array organized as a number of congruence classes each containing a plurality of cache lines. Cache directory 140, which records the contents of data storage 130 and associated state information, includes a number of sets 142 that each correspond to a congruence class within data storage 130. Each set 142 contains a number of directory entries 144 for storing the address tag and coherency state of a corresponding cache line within the congruence class of data storage 130 with which the set 142 is associated.

Cache directory 140 has associated LRU logic 150, which stores an indication of how recently each entry within each congruence class of data storage 130 has been accessed. Thus, the indication within LRU logic 150 associated with each congruence class indicates the least recently accessed member, the second least recently accessed member, the third least recently accessed member, and so on.

During operation, cache 132 receives request addresses associated with cache operation requests from both its associated CPU 60 (perhaps via a higher level cache) and from local interconnect 58. The request addresses include high order tag bits, middle order index bits, and low order offset bits. As illustrated in FIG. 4, index bits of each request address received by cache 132 are input into both cache directory 140 and LRU logic 150. In response to receipt of the index bits, LRU logic 150 outputs a decoded CASTOUT_VICTIM signal 152, which indicates a member of the selected congruence class that may possibly be replaced in response to the cache operation request. CASTOUT_VICTIM signal 152 is input into both cache controller 156 and a multiplexer 154.

The index bits of the request address select a set 142 within cache directory 140. The tag (T) stored within each entry 144 of the selected set 142 is then individually compared with the tag bits of the request address utilizing comparators 146, which each produce a 1-bit match indication. The bits output by comparators 146 together form a decoded HIT/MISS signal 148, which is input into cache controller 156, multiplexer 154, and OR gate 153. OR gate 153 logically combines HIT/MISS signal 148 to produce a select signal that selects HIT/MISS signal 148 as the output of multiplexer 154 in response to a hit and selects CASTOUT_VICTIM signal 152 as the output of multiplexer 154 in response to a miss. The output of multiplexer 154 forms a decoded SELECT signal 155.

In parallel with the comparison of the tag bits by comparators 146, the coherency state (CS) and tag (T) stored within each of the entries of the selected set 142 are input into multiplexer 147. SELECT signal 155 then selects as the output of multiplexer 147 the coherency state and tag associated with the matching member, if the request address hit in cache directory 140, or the coherency state and tag associated with the LRU member, if the request address missed in cache directory 140. The selected coherency state and tag 149 are then input into cache controller 156.

In response to receipt of the cache operation request, HIT/MISS signal 148, coherency state and tag 149, and CASTOUT_VICTIM signal 152, cache controller 156 queues the request within one of its request queues 134 and performs appropriate data handling and directory update operations. For example, in response to a read-type request by the associated CPU 60 missing in cache directory 140, cache controller 156 places a request for the cache line containing the request address on local interconnect 58, supplies the requested data to the associated CPU 60 upon receipt of the requested data from a local cache hierarchy 62, local system memory 68 or other node 52, and stores the requested cache line in the congruence class member specified by CASTOUT_VICTIM signal 152. Alternatively, in response to a read request by the associated CPU 60 hitting in cache directory 140, cache controller 156 reads the requested data out of data storage 130 and supplies the data to the associated CPU 60. Whenever servicing a cache operation request requires access to or replacement of a cache line, cache controller 156 generates an LRU_UPDATE signal 158 that is utilized by LRU logic 150 to update the LRU indication associated with the accessed congruence class. As discussed below, cache controller 156 similarly performs cache update and data handling operations in response to snooping operations on local interconnect 58 by reference to snoop queues 135.

Remote Read-type Operations

Figure 5:
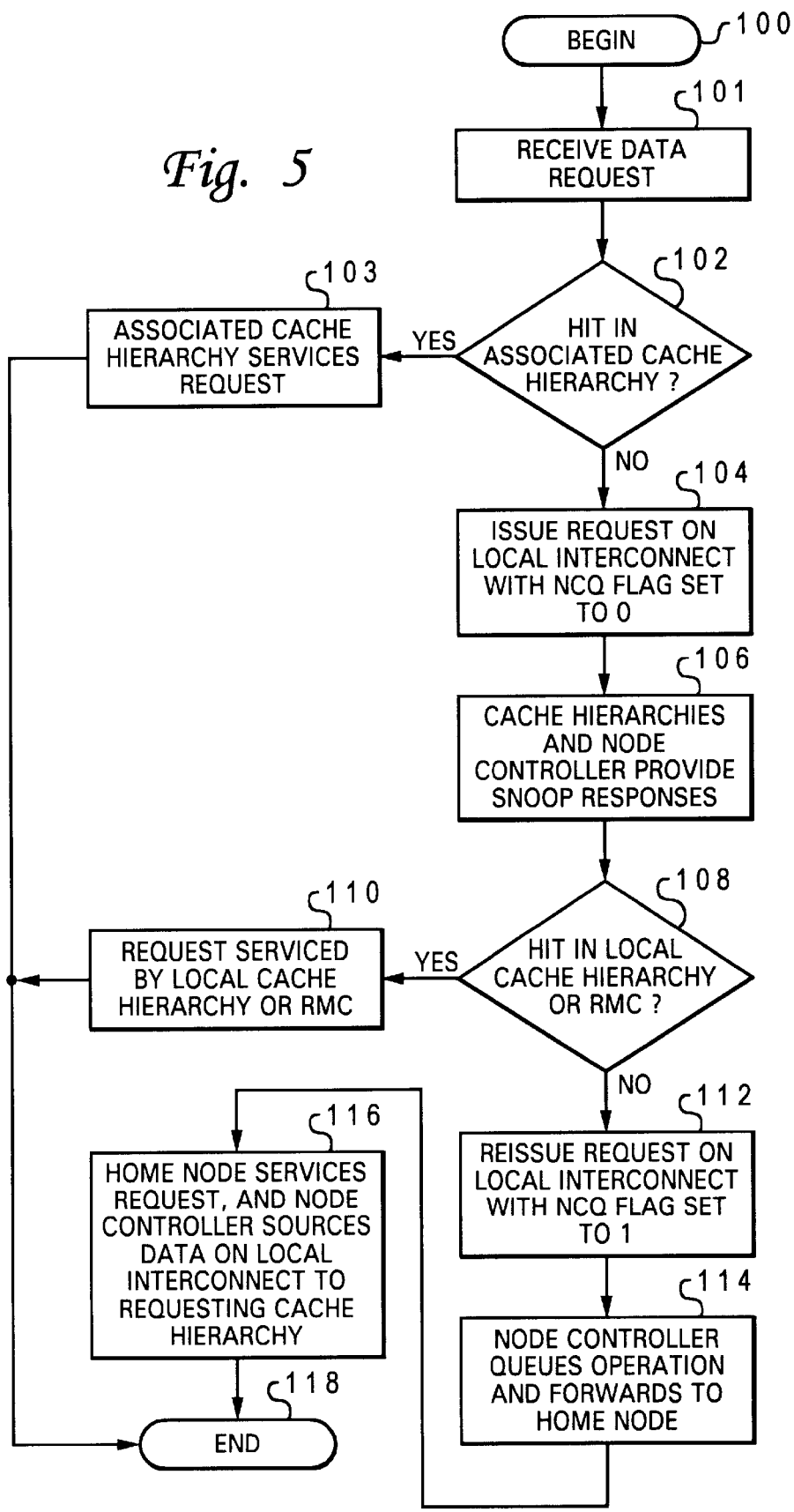
FIG. 5 is a high level logical flowchart of an exemplary method of issuing read-type requests that request data from another node of a NUMA computer system in accordance with the present invention.

With reference now to FIG. 5, there is illustrated a high level logical flowchart of a method of servicing a CPU load or store request in accordance with the present invention. The process illustrated in FIG. 5 begins at block 100 and then proceeds to block 101, which illustrates a lowest level cache 132 in one of nodes 52 of NUMA computer system 50 (or 50') receiving from the associated CPU 60 a request for data or instructions (hereafter simply referred to as data). Receipt of the request at the lowest level cache 132 indicates that the request missed in the higher level cache(s) of cache hierarchy 62.

As discussed above, in response to receipt of the request, lowest level cache 132 determines if the request hits in lowest level cache 132, as shown at block 102. If so, cache controller 156 services the request by supplying CPU 60 the requested data, as depicted at block 103, and the process terminates at block 118. If, however, a determination is made at block that the request missed in lowest level cache 132, cache controller 156 of lowest level cache 132 issues on its local interconnect 58 a read-type request (e.g., a READ for a load request or a read-with-intent-to-modify (RWITM) for a store request) targeting the requested data, as shown at block 104.

FIG. 6 illustrates an exemplary embodiment of the read-type request in accordance with the present invention. As shown, the read-type request includes conventional fields such as source and destination tag fields 119 and 120, address and parity fields 121 and 122, and a transaction descriptor field 124 indicating the size and type of the operation (e.g., READ or RWITM). In addition, the read-type request may include a prefetch field 128 described below with respect to FIGS. 15A–15C. Furthermore, in accordance with the present invention, the read-type request includes a node controller queue (NCQ) flag 126 indicating whether or not the read-type request should be enqueued in one of the queues 57 of the local node controller 56. According to the present invention, the pendency of operations within queues 57 of node controller 56 is reduced by first issuing the read-type request (e.g., as shown at block 104) with NCQ field 126 set to 0 to instruct node controller 56 not to queue the read-type request.

Returning to FIG. 5, the process proceeds from block 104 to block 106, which depicts other local cache hierarchies 62, memory controllers 64, and node controller 56 all snooping the read-type request and providing appropriate snoop responses. The possible snoop responses preferably include those listed below in Table II.

TABLE II

| Snoop response | Meaning |
| --- | --- |
| Retry | Source of request must reissue request |
| Modified intervention | Line is modified in cache and will be sourced from cache to requestor |
| Shared intervention | Line is unmodified in cache (and possibly shared) and will be sourced from cache to requestor |
| Remote address | Home node for line is another node (node controller only) |
| Shared | Line is held shared in cache |
| Null | Line is invalid in cache |

Importantly, although the local node controller 56 provides a "Remote address" snoop response to read-type requests for data having another node as the home node, node controller 56 does not immediately queue such read-type requests in one of its queues 57 for transmission to the remote node because NCQ field 126 of the read-type request is set to 0.

As shown at block 108, response logic 63 in the interface unit 65 that issued the read-type request combines all of the snoop responses to produce a combined response indicating how the request will be serviced (e.g., by indicating the highest priority snoop response). Interface unit 65 supplies this combined response to each snooper on local interconnect 58, including the requesting cache hierarchy 62. If the combined response indicates that the request address hit in a local cache hierarchy 62 or RMC 70 that can serve as a source for the requested data, the process proceeds from block 108 to block 110, which illustrates the read-type request being serviced by the local cache hierarchy 62 or RMC 70. Thereafter, the process terminates at block 118.

Returning to block 108, if the combined response to the read-type request is a "Remote address" combined response indicating that no local cache hierarchy 62 or RMC 70 can serve as a source for the requested data, the cache controller 156 of the lowest level cache 132 in the requesting cache hierarchy 62 reissues the read-type request on local interconnect 58 with NCQ flag 126 set to 1, as shown at block 112. As before, each of the snoopers provides a snoop response to the read-type request, and interface unit 65 provides a combined response. However, as illustrated at block 114, when the read-type request is again snooped by node controller 56, node controller 56 queues the request in one of its queues 57 for transmission to the home node 52 of the request address because NCQ field 126 is set to 1. After queuing the read-type request, node controller 56 forwards the read-type request to the home node 52 for servicing without waiting for the second combined response. (Node controller 56 need not wait to received the combined response because NCQ field 126 already indicates that node controller 56 must handle servicing the read-type request.) As depicted at block 116, the home node 52 services the request by supplying the requested data via node interconnect 55 to node controller 56, which in turn supplies the requested data to the requesting cache hierarchy 62 (and RMC 70, if implemented as an inclusive cache) via local interconnect 58. Thereafter, the process terminates at block 118.

The process illustrated in FIG. 5 advantageously permits the depth of queues 57 in node controller 56 to be much less than that of queues 32 in prior art node controller 24 of FIG. 1. The reason for this permissible reduction in queue depth is that the number of read-type requests that are queued and the queuing duration is greatly decreased.

In prior art NUMA computer system 8 of FIG. 1, node controller 24 enqueues within queues 32 each snooped read-type request for remote data in the event that the local combined response will subsequently indicate that the read-type request must be serviced by another node 10. Thus, node controller 24 needlessly queues a number of read-type requests that the combined response later indicates can be serviced locally (e.g., from RMC 28). Moreover, node controller 24 queues read-type requests from the time the request address is snooped to the time the combined response is received, which may take 80 cycles or more. During this long interval, queues 32 in prior art node controller 24 are required to maintain global coherency of all inbound and outbound operations in queues 32 by snooping operations on local interconnect 11 and node interconnect 12 against queues 32. Consequently, queues 32 must be very deep.

In contrast, according to the method of FIG. 5, node controller 56 only queues read-type requests that must be sent to other nodes 52 for servicing. In addition, read-type requests that are queued within queues 57 are only queued for the interval between receipt of the reissued read-type request having NCQ field 126 set to 1 and the transmission of the read-type request on node interconnect 55. Thus, the depth of queues 57 is not dependent upon the address-to-combined response latency.

Of course, this advantageous reduction in queue depth comes at the expense of adding an additional address-to-combined response latency to the servicing of read-type requests that must be transmitted between nodes 52. However, given the large amount of RMC 70, such requests are rare. In addition, the latency associated with servicing requests that must be forwarded to the home node is typically so large that incurring an additional address-to-combined response latency in the remote node does not significantly impact performance.

Finally, those skilled in the art will appreciate that the method of FIG. 5 is not limited to NUMA computer systems. Instead, the present invention is generally applicable to SMP computer systems having hierarchical interconnect architectures and other computer systems in which the communication latency between snoopers is not uniform.

Cache Line Deallocation

When a cache line is requested and received from another node 52 as illustrated at blocks 114 and 116 of FIG. 5, a cache line must be deallocated from the requesting cache hierarchy 62 and/or RMC 70 to accommodate the new cache line. In contrast to the prior art NUMA computer system described above, in which remote nodes always silently deallocate unmodified cache lines, a NUMA computer system in accordance with the present invention preferably implements a deallocate operation that permits a remote node to notify a home node when the remote node deallocates a cache line checked out from the home node. Thus, the present invention enables LMDs 72 to contain more precise information regarding data from the associated system memory address space 68 that are held at remote nodes 52.

Figure 7:
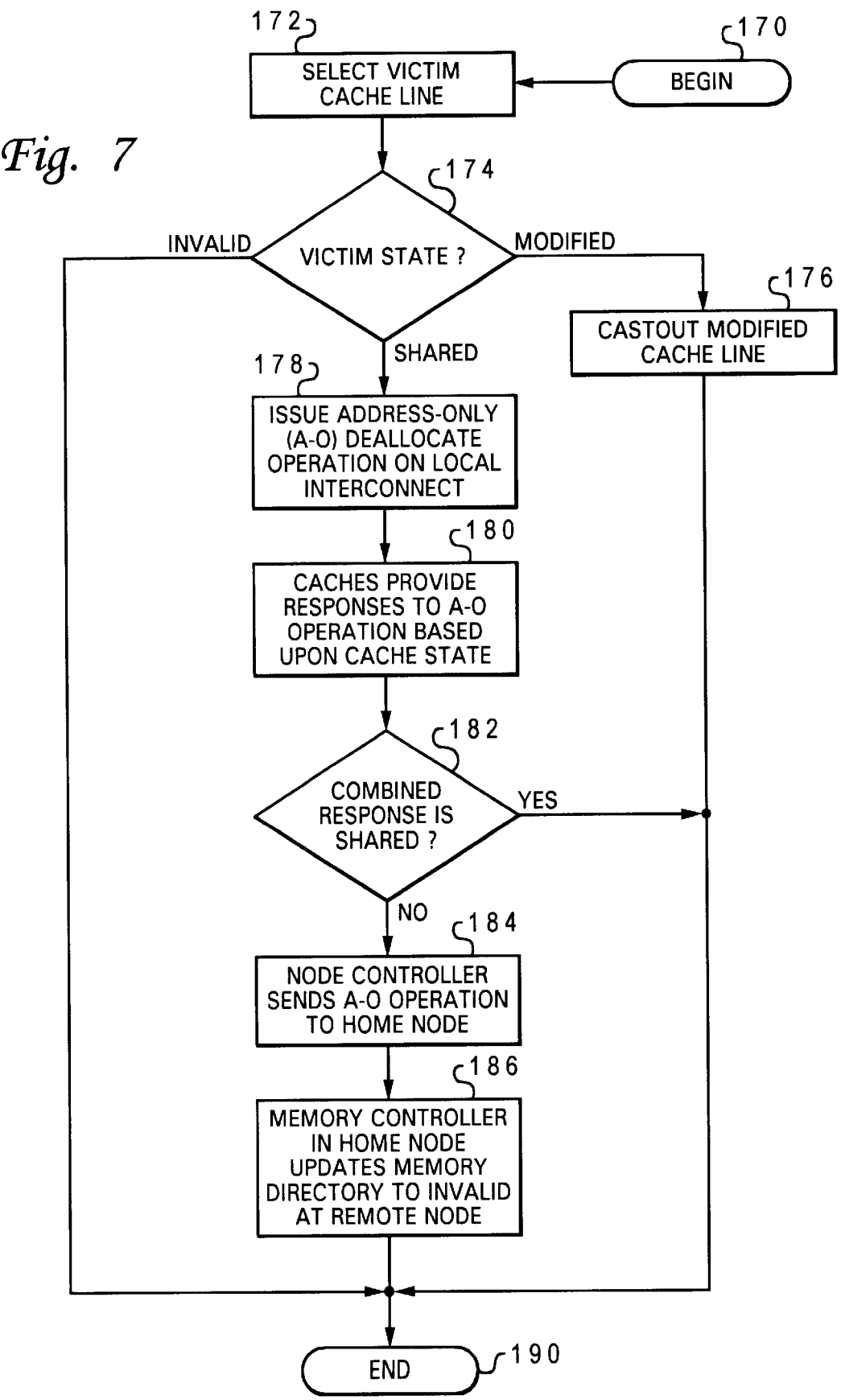
FIG. 7 is a high level logical flowchart of an exemplary method of deallocating a victim cache line in a shared coherency state from a remote node in accordance with the present invention.
Figure 8:
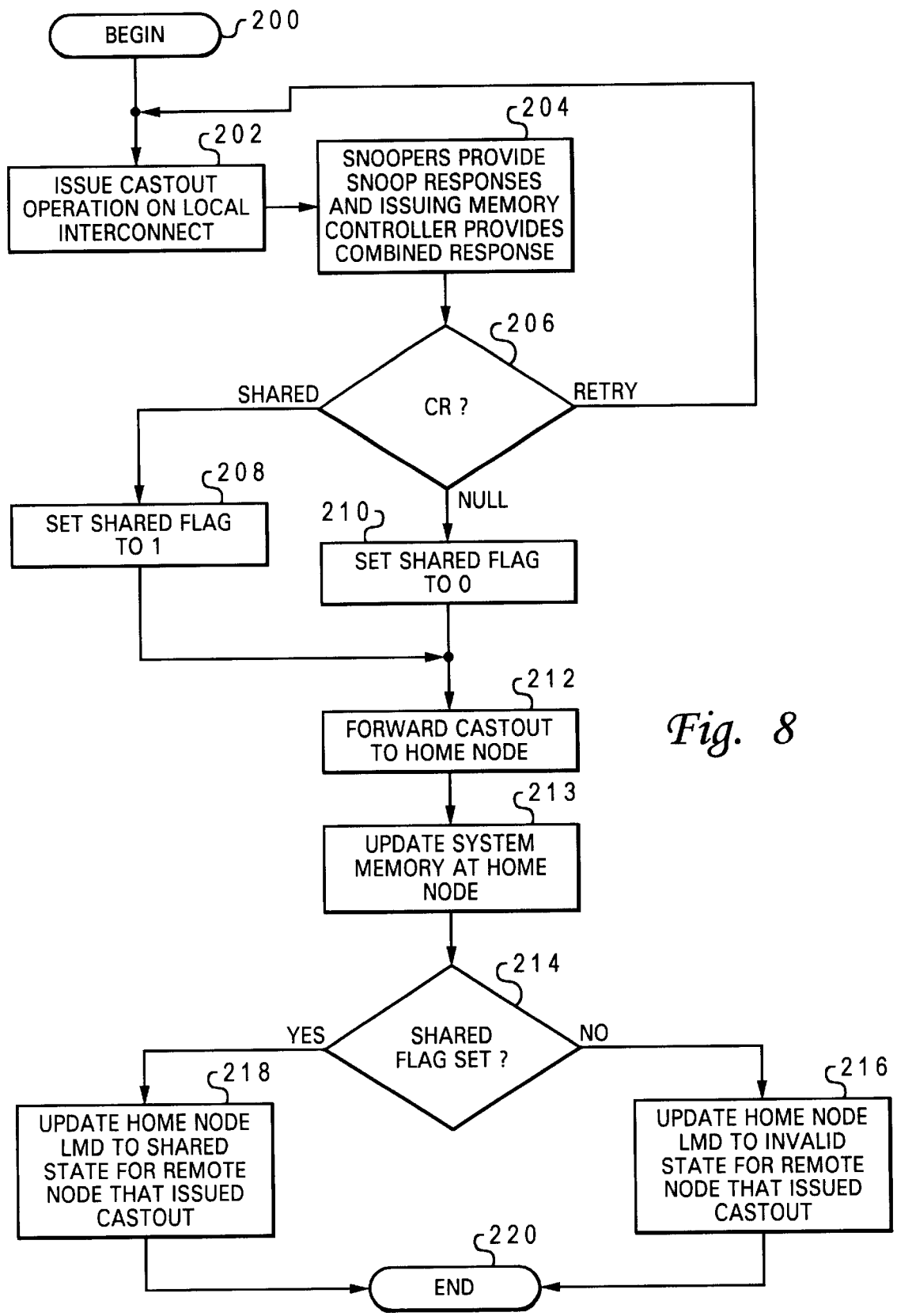
FIG. 8 is a high level logical flowchart of an exemplary method of deallocating a victim cache line in a modified coherency state from a remote node of a NUMA computer system in accordance with the present invention.

Referring now to FIGS. 7 and 8, there are illustrated high level logical flowcharts depicting the deallocation of a cache line from a RMC 70 in accordance with a preferred embodiment of the present invention in which RMC 70 is implemented as a "victim cache" that stores remote data deallocated from local cache hierarchies 62. Those skilled in the art will appreciate, however, that the depicted deallocation process is also applicable to embodiments in which RMC 70 is inclusive of the remote data held in local cache hierarchies 62.

Referring first to FIG. 7, the process begins at block 170 and thereafter proceeds to block 172, which illustrates the RMC controller 73 of a memory controller 64 that controls a RMC 70 selecting a victim cache line for deallocation, for example, based upon which cache line is least recently used (LRU), most recently used (MRU), a random selection, or other victim selection criteria. As illustrated at block 174, RMC controller 73 then deallocates the victim cache line in accordance with its coherency state, which is recorded in RMD 74. If RMD 74 indicates that the coherency state of the victim cache line is invalid, the victim cache line can simply be overwritten with the requested data without providing any notification to the home node 52. Accordingly, the process passes directly from block 174 to block 190 and terminates.

If, on the other hand, RMD 74 indicates that the selected victim cache line is modified with respect to corresponding data resident in the system memory address space 68 at the home node 52, memory controller 64 initiates a deallocation process for modified data, which is illustrated at block 176 and described in detail below with reference to FIG. 8. Finally, if RMD 74 indicates that the victim cache line is in a shared coherency state (i.e., may also be cached locally in a cache hierarchy 62 and, if so, is not modified with respect to system memory 66 at the home node 52), then memory controller 64 may notify the memory controller 64 in the home node associated with the system memory 66 containing a copy of the deallocated cache line, even though such notification is not strictly necessary for maintaining coherency.

As shown at block 178, memory controller 64 begins the process of deallocating a shared victim cache line from remote memory cache 70 by issuing an address-only deallocate operation on local interconnect 58. In response to snooping the address-only deallocate operation, node controller 56 enqueues the operation, and local cache hierarchies 62 and other snoopers provide a snoop response to the deallocate operation indicative of the coherency state of the victim cache line with respect to that cache hierarchy 62 (typically a shared or invalid state), as shown at block 180. These snoop responses are combined by response logic in the interface unit 65 that issued the deallocate operation to produce a combined response, which is then provided to all of the snoopers coupled to local interconnect 58. As shown at block 182, if the combined response indicates that one or more of the local cache hierarchies 62 store the victim cache line in a shared state, the process terminates at block 190, indicating that the victim cache line is deallocated from RMC 70 without notifying the home node 52. No notification is provided to the home node 52 since no update to the home node's LMD 72 is necessary.

However, if the combined response indicates that the victim cache line is not cached locally in a shared state (i.e., the combined response is Null), the local node controller 56 transmits the queued address-only deallocate operation to the node controller 56 of the home node 52, as illustrated at block 184, and dequeues the deallocate operation. The node controller 56 at home node 52 then issues the address-only deallocate operation on its local interconnect 58. As depicted at block 186, the memory controller 64 responsible for the address of the victim cache line updates the entry corresponding to the victim cache line in LMD 72, which is in the Shared state, to the Invalid state to indicate that the victim cache line is no longer cached at that particular remote node 52. Thereafter, the process illustrated in FIG. 7 terminates at block 190.

With reference now to FIG. 8, there is illustrated an exemplary method of deallocating a modified cache line from a RMC 70 in accordance with the present invention. In the depicted embodiment, it is assumed that the coherency protocol implemented by cache hierarchies 62 and RMCs 70 is a variant of the well-known MESI protocol that includes a Tagged (T) coherency state. As described in U.S. patent application Ser. No. 09/024,393, which is assigned to the assignee of the present invention and incorporated herein by reference, the Tagged (T) coherency state indicates that (1) a cache line is modified with respect to system memory (2) that cache line may be held in multiple caches associated with different processing units, and (3) that the cache holding the cache line in T state is currently responsible for writing back the cache line to system memory.

The process illustrated in FIG. 8 begins at block 200 following a determination that a victim cache line in RMC 70 selected for deallocation is a modified cache line, as illustrated at blocks 172–174 of FIG. 7. The process next proceeds to block 202, which depicts the RMC controller 73 associated with the RMC 70 issuing a castout write operation on local interconnect 58.

As depicted in FIG. 9, an exemplary castout WRITE operation 240 in accordance with the present invention may include conventional fields such as source and destination tag fields 241 and 242, address and address parity fields 243 and 244, and a transaction descriptor field 246 indicating that size and type of the operation. In addition, as discussed further below, the castout write operation includes a shared (S) flag 248 that can be set to indicate whether or not the castout write operation received a shared snoop response when issued on a local interconnect 58. Finally, the castout write operation includes a data field 250 containing the modified victim cache line and an associated data parity field 252.

As depicted at block 204, in response to snooping the castout write operation, each of the snoopers coupled to local interconnect 58 provides a snoop response that, for cache hierarchies 62, is indicative of the coherency state of the victim cache line at each snooper. In addition, node controller 56 enqueues the castout write in queues 57. As discussed above, response logic 63 within the interface unit 65 associated with the memory controller 64 that issued the castout write operation combines the snoop responses to produce a combined response, which is provided to all of the snoopers. If the combined response is a Retry combined response, the process returns to block 202, which has been described. However, if the combined response is other than Retry, node controller 56 sets shared flag 248 in the queued castout write operation in accordance with the combined response. Thus, if, as shown at block 208, the combined response is Shared, indicating that one of cache hierarchies 62 holds a copy of the modified victim cache line as permitted by the Tagged (T) coherency state, node controller 56 sets shared flag 248 to 1. If, on the other hand, no local cache hierarchy 62 holds a valid copy of the victim cache line, node controller 56 receives a Null combined response and accordingly sets shared flag 248 to 0 at block 210.

Node controller 56 thereafter dequeues the castout write operation and transmits it to the home node 52 of the victim cache line, as illustrated at block 212. Following receipt of the castout write operation at the home node 52, the node controller 56 at the home node 52 issues the castout write operation on the local interconnect 58 of the home node 52. In response to the castout write operation, the memory controller 64 responsible for the victim cache line address updates system memory address space 68 with the castout data, as shown at block 213. In addition, the memory controller 64 updates the associated coherency state for the remote node 52 in LMD 72 in accordance with the state of shared flag 248. Thus, as illustrated at block 218, if shared flag 248 is set to 1, memory controller 64 sets the coherency state for the victim cache line at the remote node 52 that issued the castout to Shared. Alternatively, as depicted at block 216, memory controller 64 updates the coherency state of the victim cache line at the remote node 52 to Invalid if shared flag 248 is set to 0. Thereafter, the deallocation process illustrated in FIG. 8 ends at block 220.

Thus, by implementing either or both of the deallocation processes illustrated in FIGS. 7 and 8, the likelihood that the memory controller 64 at the home node 52 will send needless invalidating operations to remote nodes 52 (e.g., in response to RWITM requests) is greatly decreased. As a result, average performance of store operations to cache lines that are sometimes shared between multiple nodes 52 is improved. It should also be noted that the address-only deallocate operation illustrated in FIG. 7 can be implemented as a weak (i.e., imprecise) operation. For example, if the memory controller 64 that originates the address-only deallocate operation receives more than a predetermined number of Retry snoop responses, the memory controller 64 can discontinue retrying the deallocate operation. In this manner, performance will not suffer under dynamic conditions (e.g., a cache directory being busy) that result in Retry combined responses.

Local Memory Directory Maintenance

In some implementations of the present invention, it may be desirable to implement an alternative or additional method of deallocating remotely held cache lines in addition to the methods illustrated in FIGS. 7 and 8. In particular, if the deallocation methods of FIGS. 7 and 8 are not implemented and/or RMCs 70 are very large, a cache line may be held in a remote node (or at least be indicated in the LMD 72 of the home node as being held in the remote node) long after the remote node has ceased to require access to the cache line. Consequently, the present invention recognizes that it would be desirable to implement some mechanism that reduces the frequency that exclusive operations (e.g., RWITM requests) are delayed by the invalidation of data held in remote nodes by issuing non-demand flush operations to the remote nodes.

In accordance with the a preferred embodiment of the present invention and as shown in FIG. 3, the mechanism is implemented as directory "scrubbing" logic (SL) 61 within the system memory controllers 71 of memory controllers 64. Directory scrubbing logic (SL) 61 periodically reads each entry in the associated LMD 72, and if the entry shows that a particular cache line is "checked out" to one or more remote nodes 52, the system memory controller 71 issues a "weak" address-only Flush query to the remote node(s).

The Flush query is termed "weak" because a remote node 52 receiving a Flush query does not have to honor it. Under normal conditions, when the Flush query is snooped by a cache hierarchy 62 in a remote node 52 holding a copy of the data, the cache hierarchy 62 invalidates the addressed line in the cache and, if the cache line is modified, writes back the cache line data to the home node 52. However, if the data are still being actively used in the remote node 52 or the cache hierarchy's snoop queues are all busy, the Flush query may be ignored.

Figure 10A:
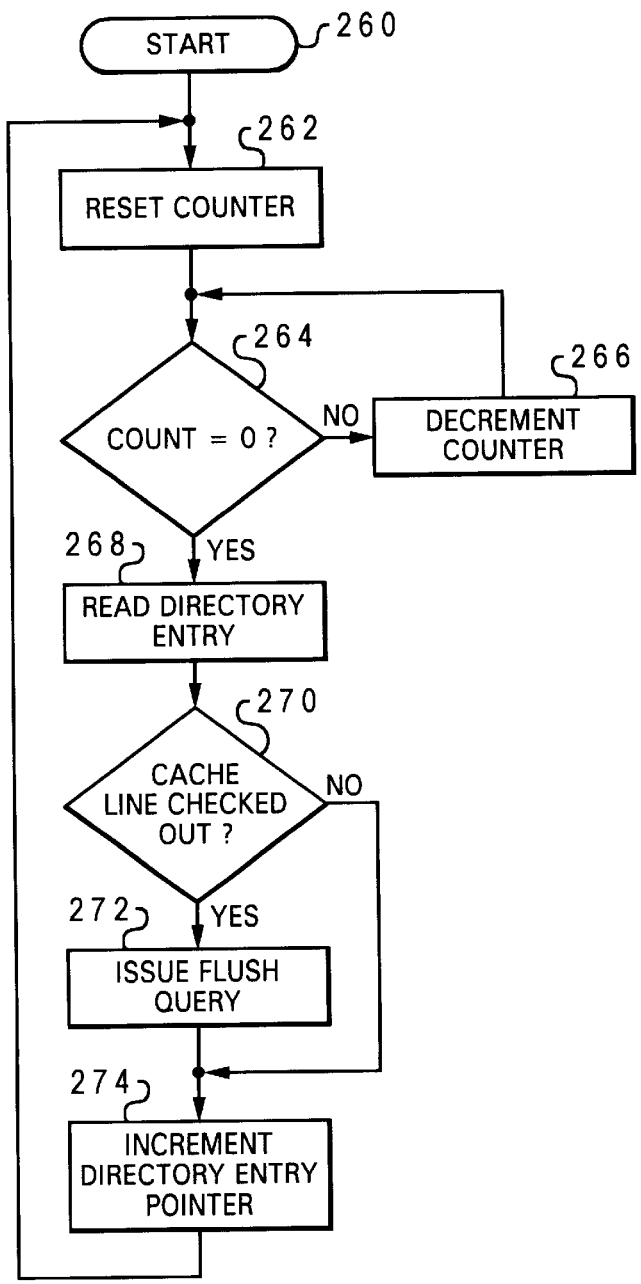
FIGS. 10A and 10B are high level logical flowcharts that together depict the use of a Flush query to request deallocation of cache lines held in remote nodes of a NUMA computer system in accordance with the present invention.

Referring now to FIG. 10A, there is illustrated a high level logical flowchart of an exemplary method of operation of directory scrubbing logic 61 in accordance with a preferred embodiment of the present invention. As illustrated, the process begins at block 260 and proceeds to block 262, which illustrates directory scrubbing logic 61 resetting a count-down counter with a selected count value that determines the frequency at which directory entries in LMD 72 are scrubbed. As will be appreciated, the initial value of the counter maybe determined by hardware or may be software programmable. Next, a determination is made at block 264 whether or not the count maintained by the counter is equal to zero. If not, the counter is decremented at block 266, and the process returns to block 264.

When a determination is made at block 264 that the counter has counted down to zero, the process proceeds to block 268, which illustrates system memory controller 71 reading a directory entry in LMD 72 indicated by a directory entry pointer. If the directory entry in LMD 72 indicates that the associated data are not held in any remote node 52 (e.g., by an Invalid state in LMD 72), then the process passes directly to block 274, which is described below. However, if the directory entry read from LMD 72 indicates that at least one remote node 52 may hold a copy of the associated data, the process proceeds from block 270 to block 272. Block 272 depicts system memory controller 71 issuing an address-only Flush query on its local interconnect 58. The Flush query is snooped by the local node controller 56 and transmitted by node controller 56 either to each remote node 52 specified in the Flush query or to all remote nodes 52, depending upon the amount of information contained in the entries of LMD 72. Following block 272, system memory controller 71 increments the directory entry pointer to point to the next entry in LMD 70. Thereafter, the process returns to block 262, and repeats.

Figure 10B:
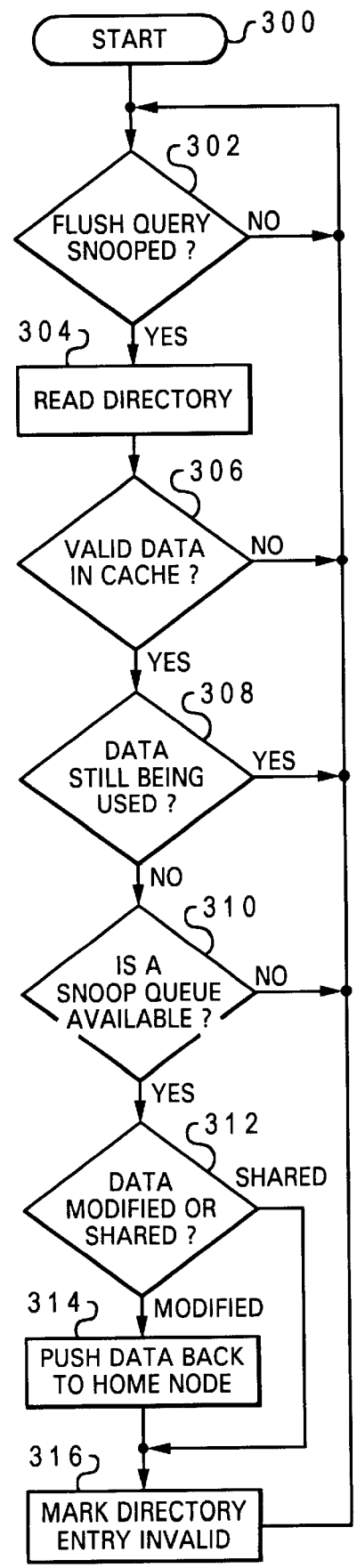

With reference now to FIG. 10B, there is depicted a high level logical flowchart of an exemplary method by which a RMC controller 73 at a remote node 52 handles an address-only Flush query issued from the home node 52 in accordance with a preferred embodiment of the present invention. The process begins at block 300 and thereafter proceeds to block 302, where the process iterates until a memory controller 64 snoops an address-only Flush query. In response to snooping an address-only Flush query, the process proceeds to block 304, which illustrates the memory controller 64 reading the directory entry identified by the address in the Flush query from its RMD 74. Based upon the coherency state indicated in the directory entry, memory controller 64 determines whether RMC 70 holds valid data associated with the Flush query address. If not, the process returns to block 302, which has been described.

Returning to block 306, in response to a determination that the directory entry in RMD 74 indicates that RMC 70 holds a valid cache line associated with the Flush query address, the memory controller 64 next determines, as represented by blocks 308 and 310, whether or not to deallocate the cache line. This determination can be based on, for example, whether the cache line is in active use in the remote node 52 and/or memory controller 64 has any available snoop queues and/or other factors. In embodiments of the present invention in which RMC 70 is implemented as inclusive of the remote data held by local cache hierarchies 62, memory controller 64 can determine whether the indicated cache line is still in active use by determining whether any of the inclusivity bits in the directory entry read from RMD 74 are set. If memory controller 64 determines not to deallocate the cache line identified in the flush query (e.g., because the cache line is still in use and/or no snoop queue is available), the identified cache line is not deallocated, and the process simply returns to block 302, which has been described.

If, on the other hand, the memory controller 64 in the remote node 52 determines that the cache line will be deallocated, the process passes to blocks 312–316, which illustrate a cache line deallocation process. According to the illustrated deallocation process, memory controller 64 deallocates non-modified cache lines simply by updating the directory entry in RMD 74; no notification is provided to the home node 52. Modified cache lines, by contrast, are invalidated in RMD 74 and also written back to the home node 52 in a conventional manner. Of course, those skilled in the art will appreciate that the deallocation methods shown in FIGS. 7 and 8 could alternatively be implemented in lieu of the deallocation process illustrated at blocks 312–316. Following the cache line deallocation process, the process shown in FIG. 10B returns to block 302.

The LMD scrubbing process illustrated in FIGS. 10A and 10B provides benefits to both low-end and high-end NUMA computer systems. In low-end NUMA computer systems in which cost is a central concern, it is advantageous if LMDs remain relatively small. Therefore, the specific node ID(s) of the node(s) that cache remote copies of a cache line are generally not maintained in the LMD. As a result, when a memory controller at the home node is required to force the invalidation of a cache line (and if the cache line is modified, to force writeback of the data to the home node) in response to a request for exclusive access to the cache line, the memory controller must broadcast a Flush command to all other nodes since the memory controller has no record of which node(s) have actually accessed the cache line. The directory scrubbing method represented by FIGS. 10A and 10B improves performance of low-end systems by reducing the occasions when a demand Flush command must be broadcast while a new requestor is waiting for data. Although low-end implementations of the present invention may still need to broadcast Flush queries to all nodes, such broadcasts tend to be performed well before exclusive access is requested by a subsequent requester.

In high-end NUMA computer systems having very large RMCs, the benefits obtained by using Flush queries to deallocate unneeded remotely held cache lines are attributable more to the management of the RMCs. Because high-end systems generally have very large RMCs, cache lines that are no longer required by processing units in a particular node may remain in the node's RMC for a very long time, and in some cases, may never get deallocated. In such cases, excepting the present invention, the only way a cache line is forced out of the cache is for the home node to issue a demand Flush command in response to a request for exclusive access to the line. Thus, the present invention "weakly" forces remote nodes to invalidate their copies of a cache line currently being tracked in the LMD so that when the home node receives a new access request for the cache line, there is a higher likelihood that the cache line can be sourced immediately from the system memory without the associated memory controller first having to issue a demand Flush command to one or more remote nodes.

It should also be noted that in some implementations of the present invention, the Flush query may also be snooped and acted upon by cache controllers 156 of cache hierarchies 62. However, because the presence of the target cache line of the Flush query within a cache hierarchy 62 may indicate that the data may subsequently be accessed, the benefit of observing Flush queries diminishes the higher up in the cache hierarchy 62 the target cache line is held. Thus, for example, it may be advisable to comply with a Flush query if the target cache line is only held in an L3 cache, but ignore the Flush query if the target cache line (or portions thereof) are held in the associated L2 or L1 caches.

Decentralized Global Coherency Management

As noted above, the present invention advantageously reduces the number of queues 57 required in node controllers 56 by decreasing the amount of time that read-type operations that require servicing at another node 52 are queued by node controllers 56. The present invention further reduces the number of address, data and command queues 57 required in node controller 56 by removing responsibility for global coherency management from node controller 56.

In prior art systems such as NUMA computer system 8 of FIG. 1, when a Flush command is received on node interconnect 12, node controller 24 is responsible for ensuring that the Flush command is successfully completed in its node 10. Node controller 24 must therefore hold the Flush command in one of its queues 32 from the time the Flush command is received via node interconnect 12 until all local cache hierarchies 18 and RMC 28 have invalidated their copies, if any, of the target cache line and have written modified data, if any, back to the home node. As will be appreciated, this process may take 2500 cycles or more, given the latency of communication over node interconnect 12. Thus, despite the fact that prior art node controllers 24 are typically equipped with deep queues 32, queues 32 can still become a performance bottleneck if coherency traffic is substantial. To address this performance bottleneck, a preferred embodiment of the present invention implements decentralized coherency management utilizing RMC controllers 73.

Figure 11:
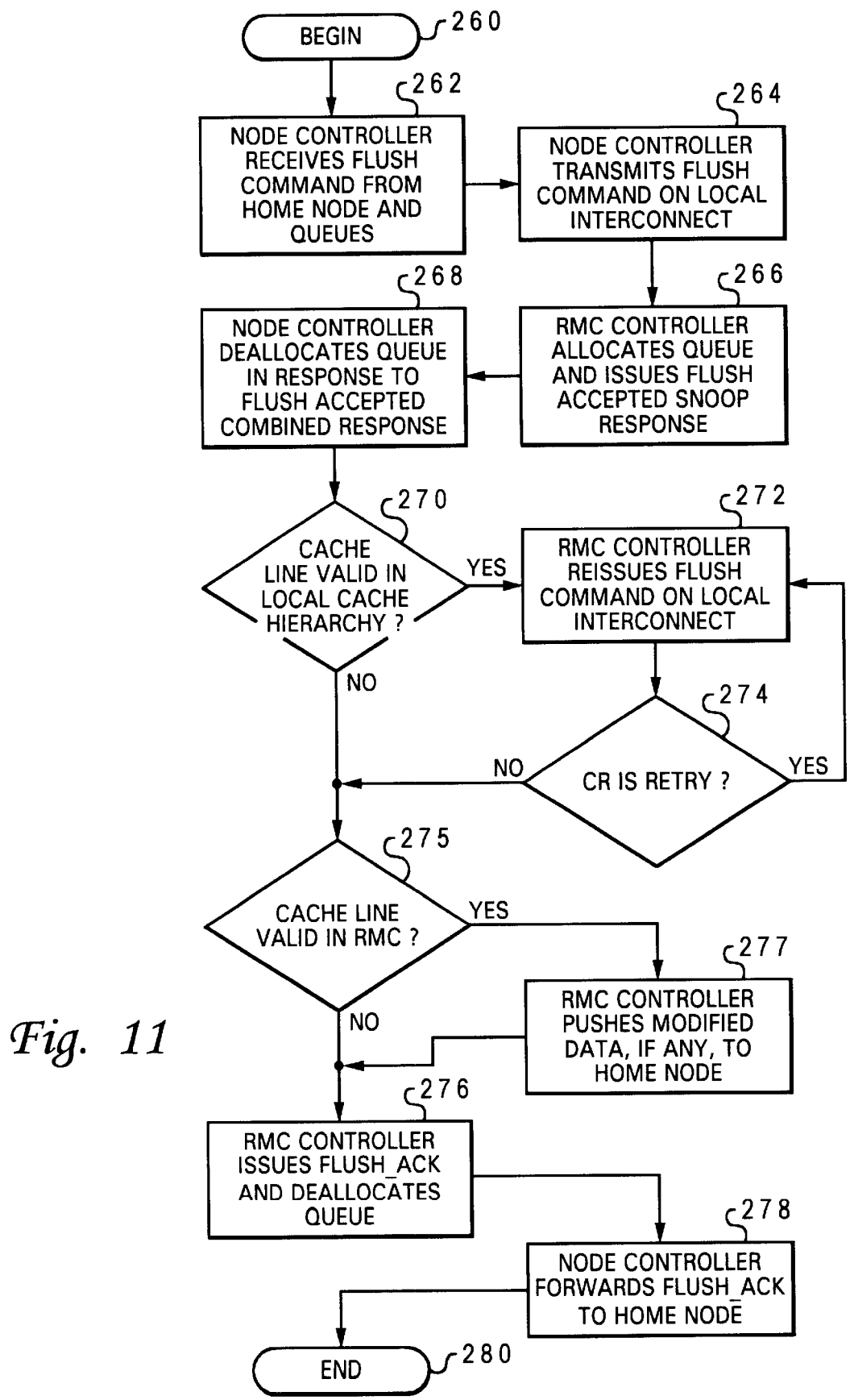
FIG. 11 is a high level logical flowchart of an exemplary method of performing a flush operation in a remote node of a NUMA computer system utilizing decentralized coherency management in accordance with the present invention.

Referring now to FIG. 11, there is depicted a high level logical flowchart of a preferred method by which a Flush command is handled utilizing decentralized coherency management in accordance with the present invention. In this depicted embodiment, it is assumed that the RMCs 70 within each node 52 are collectively inclusive of all of the data from other nodes 52 cached within the local cache hierarchies 62.

As shown, the process shown in FIG. 11 begins at block 260 and thereafter proceeds to block 262, which illustrates a node controller 56 at a remote node 52 receiving a Flush command specifying a flush address of a cache line to be invalidated in the remote node 52, with modified data, if any, being written back to the home node 52. As noted above, such Flush commands are typically issued by a memory controller 64 in the home node 52 in response to receipt of a RWITM request for a cache line indicated in LMD 72 as "checked out" to one or more remote nodes 52. In response to receipt of the Flush command, the node controller 52 at the remote node 52 enqueues the Flush command in queues 57, and as shown at block 264, transmits the Flush command on its local interconnect 58.

In response to snooping the Flush command, local memory controllers 64 each provide a snoop response. As depicted at block 266, the memory controller 64 associated with the RMC 70 to which the target address maps (hereinafter referred to as the responsible memory controller) provides a snoop response (which may simply be a Null snoop response) indicating that the memory controller 64 is accepting coherency management responsibility for the Flush command, and queues the Flush command in one of its queues 77. These snoop responses are combined by node controller 56 to produce a "flush accepted" combined response (e.g., a Null combined response), which node controller 56 provides to all of the snoopers. Importantly, because the combined response indicates that the responsible memory controller 64 has accepted responsibility for ensuring that the Flush command will be completed in this remote node 52, the node controller 56 deallocates the queue 57 allocated to the Flush command at block 268, thereby freeing this resource for handling other operations.

Next, as depicted at block 270, the RMC controller 73 of the responsible memory controller 64 determines by reference to the inclusivity information in its RMD 74 whether or not a valid copy of the cache line associated with the flush address is held in any local cache hierarchy 62. If so, the process passes to block 272, which illustrates RMC controller 73 reissuing the Flush command on local interconnect 58 to force the invalidation of the locally held copies of the cache line associated with the flush address. In response to snooping the Flush command, cache hierarchies 62 and other memory controllers 64 provide snoop responses. As discussed above, cache hierarchies 62 that do not hold a valid copy of the target cache line provide a Null snoop response, and cache hierarchies 62 that hold a copy of the target cache line provide a Retry snoop response to Flush commands until the target cache line is invalidated and modified data, if any, are written back to the home node. These snoop responses are combined by response logic 63 in the interface unit 65 associated with the responsible memory controller 64. As depicted at block 274, if the combined response is a Retry combined response, indicating that at least one cache hierarchy 62 is still in the process of invalidating its copy of the target cache line or writing back modified data to the home node 52, the process returns to block 272, which has been described. However, if a Null combined response is received, indicating that the flush process is complete in the remote node 52, the process proceeds from block 274 to block 275.

Block 275 illustrates RMC controller 73 determining by reference to RMD 74 whether or not its associated RMC 70 holds a valid copy of the cache line identified by the flush address. If not, the process proceeds to block 276, which is described below. However, if RMC 70 holds a valid copy of the target cache line of the Flush command, RMC controller 73 invalidates the target cache line in RMC 70 and writes back modified data, if any, to system memory in the home node 52, as shown at block 277.

The process then proceeds from block 277 to block 276, which depicts RMC controller 73 issuing a Flush_Ack operation on local interconnect 58 to indicate local completion of the flush operation and deallocating the queue 77 allocated to handling the Flush command. As shown at block 278, node controller 56 briefly queues the Flush_Ack operation and forwards it to the home node 52 to indicate to the home node's memory controller 64 that the flush operation has been completed at the remote node 52. Thereafter, the process shown in FIG. 11 terminates at block 280.

As demonstrated by the process illustrated in FIG. 11, the present invention increases the number of global coherency management operations that can be serviced concurrently while permitting simplification of the node controller design by moving responsibility for global coherency management from the node controller to the memory controllers. This implementation not only permits a large number of concurrent coherency maintenance operations to be supported, given the large pool of queues provided by RMC controllers 73, but also scales as the number of processing units 54 increases, thereby addressing a potential performance bottleneck.

Distributed Global Coherency Management

The present invention not only promotes decentralized coherency management by memory controllers rather than centralized coherency management by a node controller, but also distributes responsibility for global coherency management for selected operations among multiple controllers to promote efficient utilization of queue resources.

In prior art NUMA computer systems, such as NUMA computer system 8 of FIG. 1, a coherency management queue 32 within the node controller 24 of the home node is allocated to a read-type request (e.g., READ or RWITM) from the time that the request is received from a remote node until the requested cache line has been successfully received by the remote node. The node controller must maintain the queue allocation for this entire duration because the node controller 24 cannot permit a Flush operation targeting the same cache line to be issued from the home node until the target cache line of the previous request has been delivered to the remote node. In other words, to maintain global coherency in prior art NUMA computer systems, the home node's node controller is responsible for strictly ordering data delivery to a remote node in response to a first request and a Flush operation due to a subsequent request, and must therefore maintain the allocation of a queue to the first request until the requested data are successfully delivered to the remote node.

The present invention improves upon the prior art coherency management techniques described above by implementing a special command (hereinafter referred to as the Numafy command) that transfers responsibility for global coherency management between controllers, thereby eliminating the ordering and queuing requirements that hamper performance of prior art NUMA computer systems. A timing diagram of an exemplary use of the Numafy command of the present invention is depicted in FIG. 12.

Figure 12:
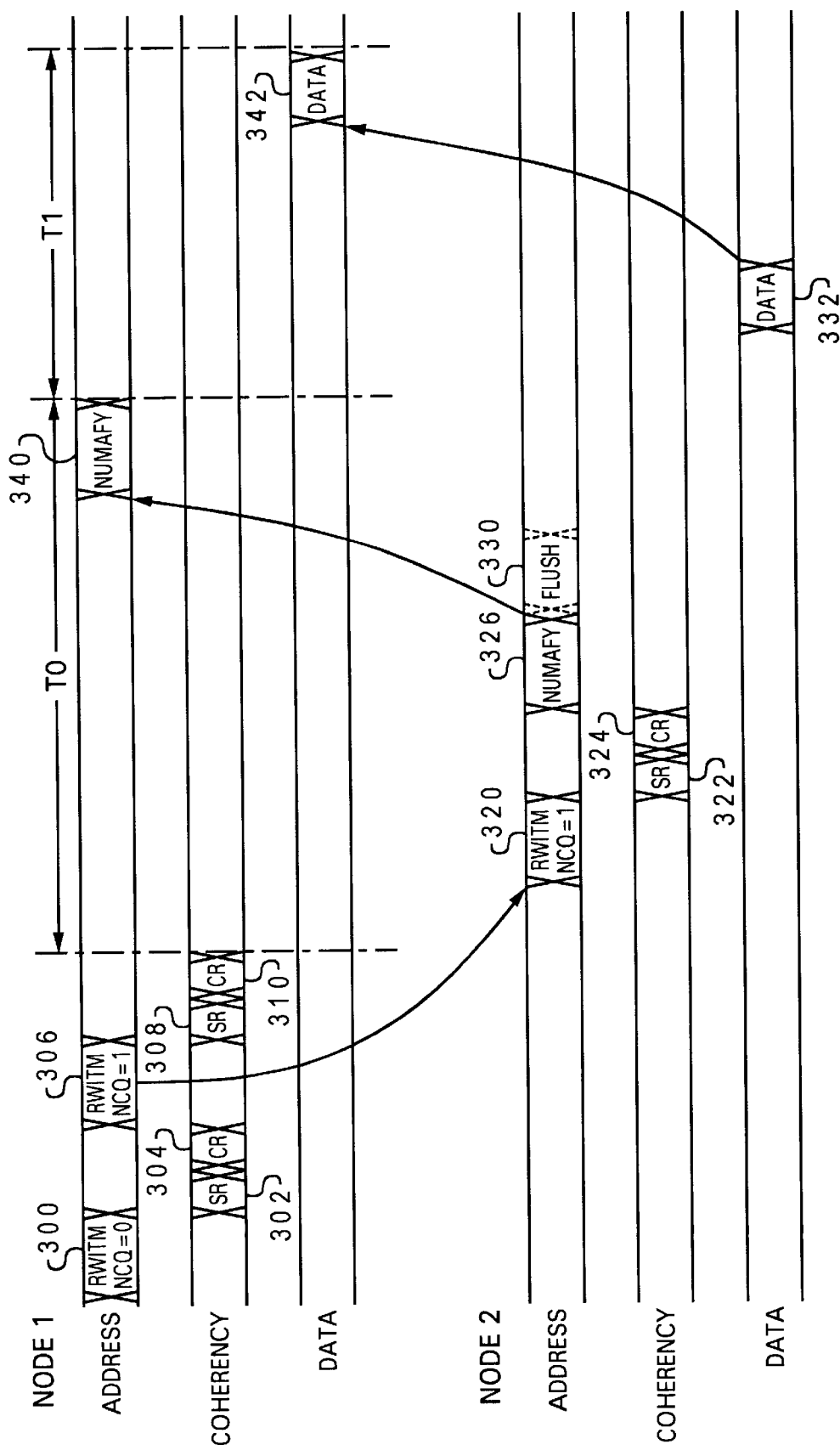
FIG. 12 is a time-space diagram illustrating the use of a Numafy command to convey responsibility for global coherency management of a target cache line of a read-type operation.

With reference now to FIG. 12, there is illustrated a time-space diagram that depicts operations on the local interconnects of a remote node and a home node of NUMA computer system 50 that are utilized to service a read-type request by the remote node. The illustrated process employs the innovative read-reissue method discussed above with reference to FIG. 5.

As illustrated, the process begins when a cache controller 156 of a lower level cache 132 in a remote node 52 (designated as Node 1 in FIG. 12) issues a read-type request, in this case a RWITM request 300, on its local interconnect 58 in order to obtain exclusive access to a cache line for which another node is the home node 52. As discussed above, cache controller 156 issues RWITM request 300 in response to a CPU store request missing in its cache directory 140. Within RWITM request 300, NCQ field 126 is initially set to 0 so that the local node controller 56 does not queue RWITM request 300 until a determination is made that RWITM request 300 cannot be serviced locally. The RWITM request is also enqueued in one of the request queues 134 of cache controller 156.

In response to snooping RWITM request 300, the snoopers (i.e., cache controllers 156, memory controllers 64, and node controller 56) coupled to local interconnect 58 provide snoop responses 302, which are combined by response logic 63 in the interface unit 65 that sourced RWITM request 300 to produce a combined response 304 provided to all snoopers. The exemplary operating scenario shown in FIG. 12 assumes that combined response 304 indicates that no snooper within Node 1 is able to provide exclusive access to the target cache line and the target address of RWITM request 300 is a remote address. In response to combined response 304, any other local cache hierarchy 62 or RMC 70 having a shared copy of the target cache line begins the process of invalidating its copy of the target cache line, and cache controller 156 reissues a RWITM request 306 having the NCQ field 126 set to 1. The snoopers coupled to local interconnect 58 respond to reissued RWITM request 306 by providing snoop responses 308, which are combined to form a second combined response 310.

As discussed above with respect to FIG. 5, node controller 56 of Node 1 forwards the RWITM request to Node 2 (i.e., the home node of the target cache line) for servicing and indicates that the request has been forwarded by providing an Node Controller Acknowledge to cache 132 via combined response 310. Upon receiving combined response 310, cache controller 156 sets a local flag 136 (see FIG. 4) associated with the queued RWITM request. Local flag 136 indicates that this cache 132 has acquired local ownership of the target cache line and will therefore "protect" its ownership of the target cache line from other local requesters, if any, that subsequently request the cache line during protection window TO by providing Retry snoop responses to such requests. However, if cache controller 156 snoops a Flush operation from the home node, cache controller 156 will ignore the Flush operation since cache 132 does not yet have a valid copy of the target cache line or global ownership of the target cache line. At this point, cache controller 156 is waiting to receive from the home node (1) the target cache line and (2) a Numafy command indicating that global ownership of the target cache line has been granted. Depending upon dynamic operating conditions, cache controller 156 can receive the target cache line and the Numafy command in any order.

As depicted, in response to receipt of the RWITM request via node interconnect 55, node controller 56 of Node 2 issues a corresponding RWITM request 320 on the local interconnect 58 of Node 2. Snoopers within Node 2 provide appropriate snoop responses 322, which are combined by node controller 56 to form a combined response 324 indicating that RWITM request 320 will be serviced by the memory controller 64 associated with the system memory address space 68 in which the target cache line data resides. Once the memory controller 64 accepts RWITM request 320 and the system memory controller 71 of that memory controller 64 queues RWITM request 320 within its coherency management queue 79, the system memory controller 71 issues a Flush command 330 to each remote node 52 other than Node 1, if any, that LMD 72 indicates holds a copy of the target cache line. In addition, system memory controller 71 issues an address-only Numafy command 326 to Node 1, and dispatches a memory read queue to supply the requested data to Node 1. If LMD 72 indicates the target cache line does not need to be flushed back from a remote node 52, the read of system memory address space 68 can begin immediately, and the target cache line data 332 may be supplied to Node 1 before Numafy command 326 is issued.

Once Numafy command 326 is issued, any required flush operations are complete, and the system memory read operation is initiated, system memory controller 71 considers the RWITM request 320 to be serviced and can then reallocate the coherency management queue 79 assigned to RWITM request 320 to a subsequent request even though Node 1 may not yet have received the target cache line data. Thus, in accordance with the present invention and in contrast to the prior art, the grant of global ownership of a cache line and the delivery of the cache line data 332 are decoupled.

In response to receiving the address-only Numafy command via node interconnect 55, node controller 56 of Node 1 issues an address-only Numafy command 340 on local interconnect 58. When requesting cache controller 156 of Node 1 snoops address-only Numafy command 340, cache controller 156 sets the global flag 138 associated with the RWITM request. A set global flag 138 indicates that requesting cache 132 has received global ownership of the target cache line and therefore must now protect the target cache line during a second protection window T1 not only from other local requesters, but also from any Flush or Clean commands from the home node. Thus, during protection window T1, which closes when requesting cache controller 156 completes servicing the RWITM request, requesting cache controller 156 must give a Retry snoop response to any Flush, Clean or other similar operation received either locally or from the home node (i.e., Node 2).

Once requesting cache controller 156 has received the target cache line data 342, cache controller 156 services the pending CPU store request and updates the coherency state of the target cache line in its cache directory 140 to a modified coherency state. At this point, servicing of the RWITM request is complete, and cache controller 156 resets both local flag 136 and global flag 138. Subsequently, cache controller 156 will not provide a Retry snoop response to Flush or Clean commands targeting the target cache line, but will instead honor such requests by "pushing" the modified data back to the home node and, for Flush commands, invalidating its copy of the cache line.

Thus, FIG. 12 illustrates a methodology for distributing global coherency management between controllers within a NUMA computer system that promotes more efficient utilization of the coherency management queues of the system memory controller by separating responsibility for system-wide coherency management from delivery of requested data. As a result, queue resources in the system memory controller are allocated to a request for only as long as the system memory controller is involved in servicing the request and are thereafter available for servicing other requests significantly earlier than in prior art systems (i.e., a duration of at least the latency of node interconnect 55, which can be 2000 cycles or more). As a result fewer coherency management queues are required to support a given level of performance.

LMD Data Ownership History

When a system memory controller 71 receives a RWITM request from a remote node as illustrated in FIG. 12, the system memory controller 71 must grant exclusive system-wide ownership of the target cache line to the requesting node in order to service the RWITM request. However, when system memory controller 71 receives a READ request for a target cache line, system memory controller 71 can grant either shared ownership or exclusive ownership of the target cache line.

In prior art NUMA computer systems such as that illustrated in FIG. 1, exclusive ownership is generally not granted by the home node in response to a READ request from a remote node if LMD 26 indicates that the target cache line is "checked out" to any remote node 10. In this manner, needless invalidation of shared copies of the target cache line at remote node(s) is avoided. However, when LMD 26 indicates that the target cache line is not "checked out" to a remote node 10, two different implementations have been employed.

In the first prior art implementation, the home node always grants non-exclusive ownership of the target cache line to a remote node in response to a READ request. Although this implementation does not cause needless invalidation of remotely held copies of the target cache line, large latencies for subsequent store operations targeting the same cache line can result because the remote node that issued the READ request must then issue a RWITM request to obtain exclusive access to the target cache line. Store instructions targeting remote data can thus be subject to long latencies (e.g., 2000 cycles or more).

According to a second prior art implementation, the performance penalty for a store instruction is eliminated by always granting exclusive ownership of a target cache line to a remote node in response to READ request if LMD 26 indicates that the target cache line is not "checked out" to a remote node. However, this second implementation can also be problematical because the home node must always issue a Clean operation (i.e., an operation that forces the writeback of the cache line, if modified, but not its invalidation) to the remote node having exclusive ownership in response to a subsequent READ request by a second remote node regardless of whether or not the first remote node has actually modified the cache line. Thus, in many cases, the subsequent READ request will be needlessly delayed until the Clean operation is complete.

Figure 13:
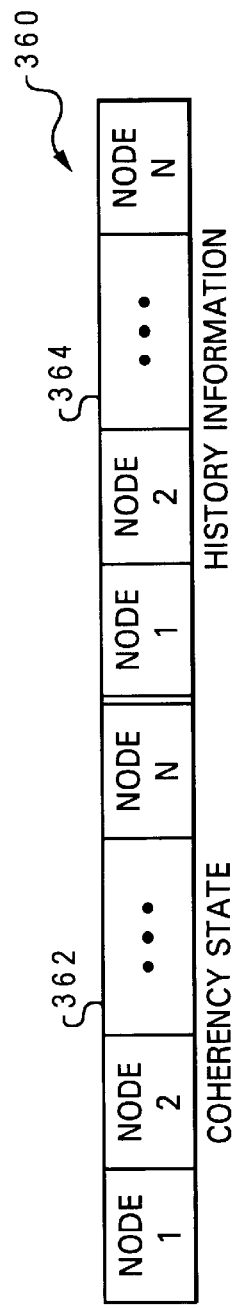
FIG. 13 illustrates an exemplary directory entry of a local memory directory (LMD) in the NUMA computer system of FIG. 2A or 2B.

The present invention addresses the shortcomings in the prior art by maintaining per-node history information for each LMD entry, where the history information indicates whether to grant exclusive or non-exclusive ownership of the associated cache line in response to a READ request by a remote node. For example, in a preferred embodiment shown in FIG. 13, each directory entry 360 in LMDs 72 includes both per-node coherency state information 362 and per-node history information 364.

Figure 14:
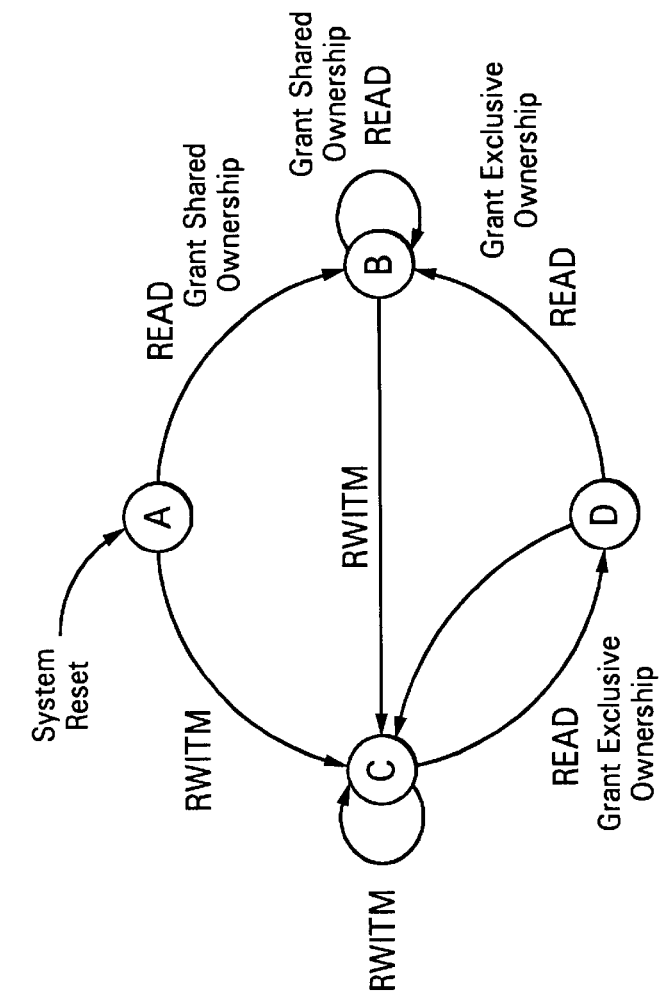
FIG. 14 is a state diagram depicting an exemplary method by which a system memory controller of a NUMA computer system updates a remote node's history information within the local memory directory (LMD) in response to a read-type request.

Those skilled in the art will appreciate that per-node history information 364 can be updated by system memory controllers 71 according to any of a large number of suitable methods. FIG. 14 illustrates a state diagram of one presently preferred method of updating history information 364. In the depicted embodiment, system memory controller 71 maintains a 2-bit history indication for each remote node, giving four possible states designated in FIG. 14 as history states A, B, C, and D. System memory controller 71 updates the history state of a remote node 52 in response to each read-type request (e.g., READ or RWITM) received from that remote node 52. When a remote node 52 issues a READ request for a cache line of data resident in the associated system memory address space 68, system memory controller 71 determines whether to grant non-exclusive or exclusive ownership of the line by reference to the history state for that cache line and remote node. The type of ownership granted by system memory controller 71 can be indicated, for example, by an Exclusive flag in the Numafy command utilized to grant ownership.

As shown in FIG. 14, system memory controller 71 initializes the history state for each remote node 52 in each directory entry 360 of LMD 72 to history state A. Thereafter, as indicated by the transition from state A to state B and the loop at state B, system memory controller 71 grants non-exclusive ownership of a cache line to a remote node 52 until that remote node 52 obtains exclusive ownership of the cache line by issuing a RWITM request.

In response to receipt of a RWITM request, system memory controller 71 grants exclusive ownership of the target cache line and updates the history state for the requesting remote node from any of possible history states A–D to state C. As indicated by the possible transitions between states C and D and states D and B, system memory controller 71 thereafter grants exclusive ownership of the cache line in response to up to two sequential READ requests by the same remote node 52. If a third sequential READ request is received from the same remote node for the same cache line, system memory controller 71 grants only non-exclusive ownership until the remote node again issues a RWITM request for the cache line.

By utilizing per-node history state information to determine whether to grant exclusive or non-exclusive ownership of a target cache line of READ request from a remote node, unnecessary latency associated with subsequent store instructions within the same remote node or a READ request by other remote node is greatly reduced as compared to the prior art. Consequently, overall performance of NUMA computer system 50 is improved.

Data and Instruction Prefetching

In prior art NUMA computer systems, such as NUMA computer system 8 of FIG. 1, data and instruction prefetch requests are initiated by a CPU's prefetch engine and then issued on the local interconnect by the cache controller of CPU's lowest level in-line cache, one READ request for each cache line to be prefetched. For deep prefetching algorithms, this conventional prefetching technique requires the cache controller to be equipped with a large number of read queues. In large multiprocessor systems, the cost of these resources is, of course, multiplied by the number of CPU chips and can therefore form a significant component of total system cost.

Depending on the source of the prefetch data (e.g., local system memory versus system memory in another node), read queues allocated to prefetch requests can remain active (busy) for long periods. Obviously, from a performance standpoint, it is undesirable to delay servicing demand read requests because all of the read queues have been allocated to prefetch requests. To address contention for read queues between demand read requests and prefetch read requests, it is possible to create a separate set of prefetch read queues; however, doing so can create additional expense and complexity and does not reduce the duration for which queues allocated to prefetch read requests remain busy.

The present invention that addresses the foregoing shortcomings in the prior art by introducing an improved prefetching technique in which prefetch operations are spawned by memory controllers rather than cache controllers. According to the present invention, when an initial demand data load or instruction fetch is issued by the requesting processing unit, prefetch hint information is appended to the READ operation. This hint information can include, for example, a number of cache lines to prefetch and a stride between cache lines. In response to receipt of the read, the memory controller sources the demanded data or instructions and then, using the prefetch hints, optionally sources prefetch data to the requesting processing unit using WRITE operations.

Figure 15A:
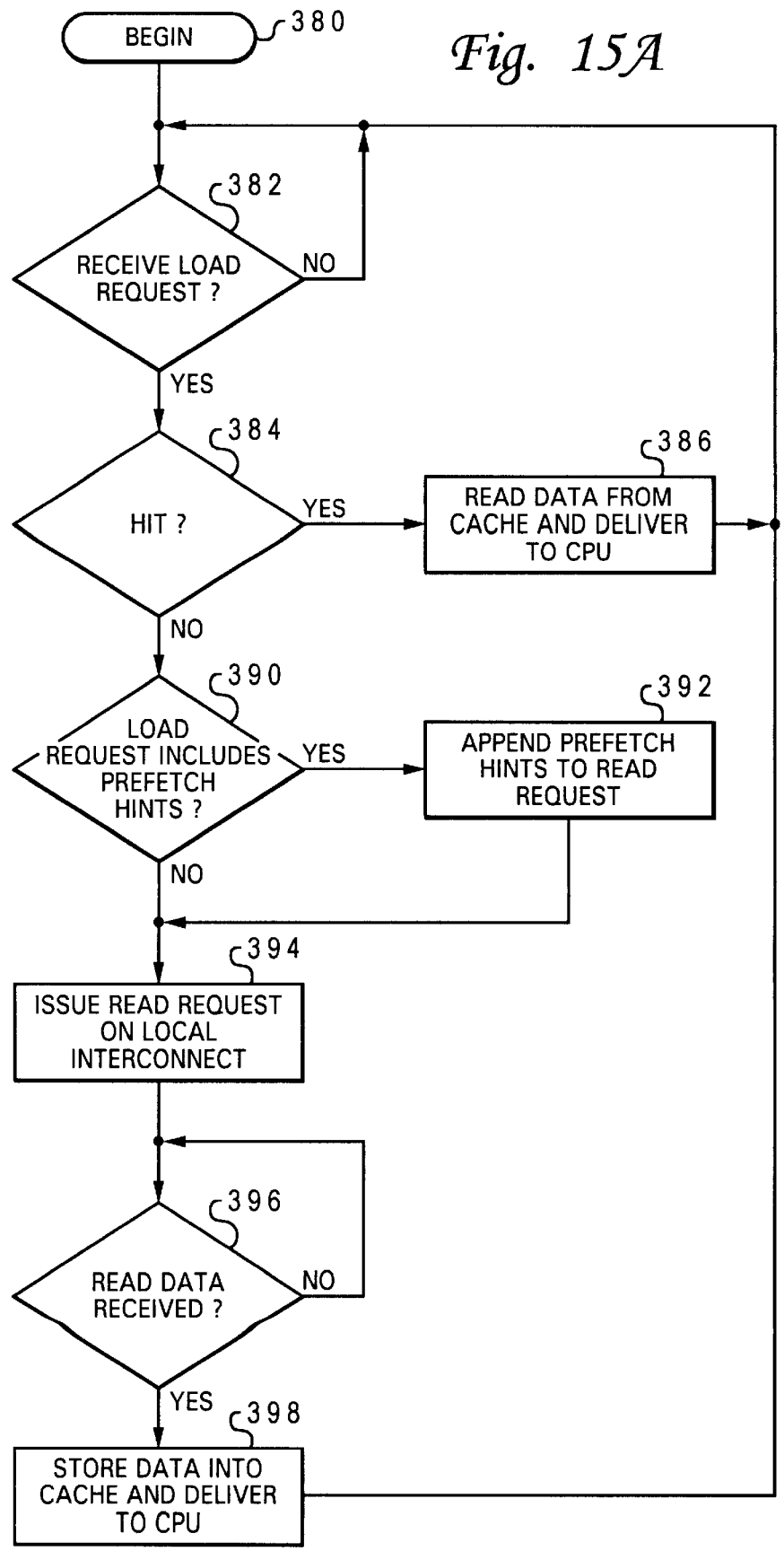
FIGS. 15A–15C together illustrate an exemplary method by which a system memory controller of a NUMA computer system controls prefetching of data and instructions in accordance with a preferred embodiment of the present invention.

Referring now to FIG. 15A, there is illustrated a high level logical flowchart of an exemplary method by which a cache controller 156 of a lower level cache 132 issues a demand READ request having an appended prefetch hint in accordance with the prefetching technique of the present invention. As illustrated, the process begins at block 380 and thereafter remains at block 382 until cache controller 156 receives a load request from its associated CPU 60. In response to receipt of a load request, cache controller 156 determines at block 384 whether or not the load request hits in its cache directory 140. If so, cache controller 156 reads the requested data from data storage 130 and supplies the requested data to the CPU 60, as shown at block 386. The process thereafter returns to block 382.

Returning to block 384, in response to cache controller 156 determining that the load request misses in cache directory 140, cache controller builds a READ request based upon the load request and appends to or includes within the READ request the prefetch hint, if any, contained in the prefetch request, as shown at blocks 390 and 392. As illustrated in FIG. 6, the prefetch hint maybe communicated in a prefetch field 128 in the READ request and may specify a number of cache lines to be prefetched and an address stride between the prefetch cache lines. Cache controller 156 then allocates a request queue 134 to the READ request, issues the READ request on its local interconnect 58 as depicted at block 394, and thereafter waits for return of the demanded data as illustrated at block 396. As described above with respect to FIG. 6, the READ request preferably includes a source tag field 119 identifying the issuing cache controller 156 or its processing unit 54.

As shown at block 398, when the demanded cache line that is the target of the READ request is received, cache controller 156 stores the cache line within data storage 130, updates cache directory 140, deallocates the request queue 134 allocated to the READ request and provides the data requested by the load request to the associated CPU 60. Thereafter, the process illustrated in FIG. 15A returns to block 382, which has been described.

Figure 15B:
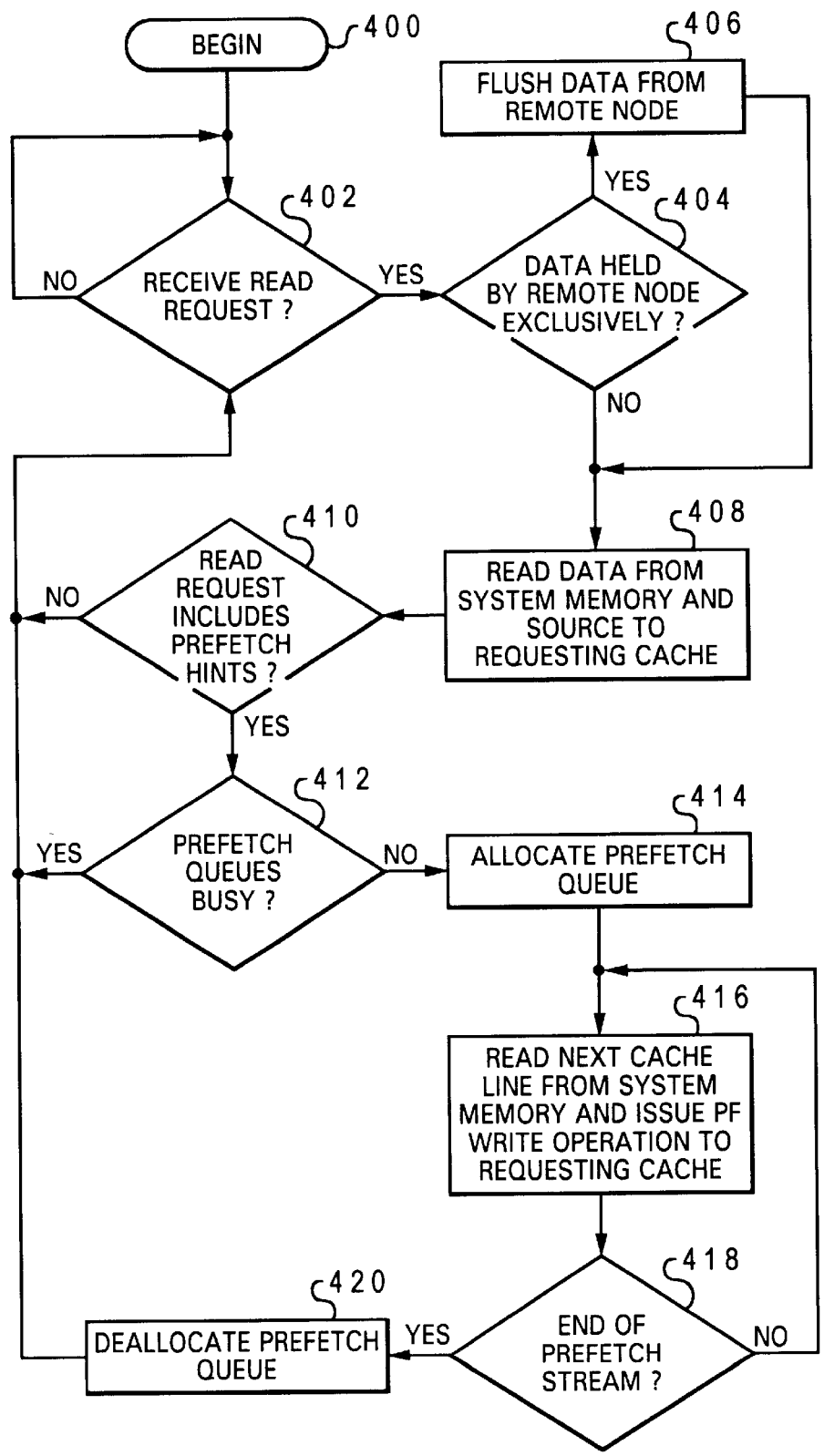

With reference now to FIG. 15B, there is depicted a high level logical flowchart of an exemplary method by which a memory controller 64 responds to a READ request including a prefetch hint in accordance with the present invention. As illustrated, the process begins at block 400 and thereafter iterates at block 402 until memory controller 64, and more particularly system memory controller 71, receives a READ request, such as that issued at block 394 of FIG. 15A. In response to receipt of a READ request, the process proceeds to block 404, which illustrates system memory controller 71 determining by reference to LMD 72 whether or not the target cache line of the READ request is held exclusively by a remote node 52. If not, the process proceeds directly to block 408. However, if LMD 72 indicates that the target cache line is held exclusively remotely, system memory controller 71 flushes the cache line from the remote node, preferably according to the process discussed above with respect to FIG. 11.

Next, at block 408, system memory controller 71 reads the target cache line from the associated system memory address space 68 and sources the requested cache line to the requesting cache 132. In addition, as illustrated at block 410, system memory controller 71 determines whether or not the READ request contains a prefetch hint in its prefetch field 128. If not, servicing of the READ request is complete, and the process returns to block 402, which has been described. However, if the READ request contains a prefetch hint in its prefetch field 128, system memory controller 71 determines at block 412 whether one of its queues 79 that may be allocated to prefetch requests is available or whether all such prefetch queues are busy. If all queues that may be allocated to prefetch requests are busy, system memory controller 71 ignores the prefetch hint, and the process returns to block 402. Thus, servicing of prefetch requests by system memory controller 71 is preferably imprecise, in that system memory controller 71 has the option of providing prefetch data but does not retry the READ request if the prefetch hint is ignored.

Returning to block 412, assuming that one of queues 79 is available for allocation to a prefetch request, the process proceeds to block 414, which illustrates system memory controller 71 allocating a prefetch queue among queues 79 to service the prefetch request. As depicted at blocks 416 and 418, system memory controller 71 then reads one or more cache lines of prefetch data specified by the prefetch hint in prefetch field 128 from the associated system memory address space 68 and transmits them to the requesting cache 132. Importantly, each cache line is transmitted to the requesting cache 132 in a prefetch WRITE operation similar to that illustrated in FIG. 9 rather than as read data, thereby eliminating the use of read queues for managing prefetch requests. To ensure correct routing of the prefetch WRITE operation, system memory controller 71 places the contents of the source tag field 119 of the READ request in the destination tag field 242 of the address portion of the WRITE operation. After transmitting the cache lines of prefetch data to the requesting cache hierarchy 62, system memory controller 71 deallocates the prefetch queue allocated from among queues 79, and the process returns to block 402.

Figure 15C:
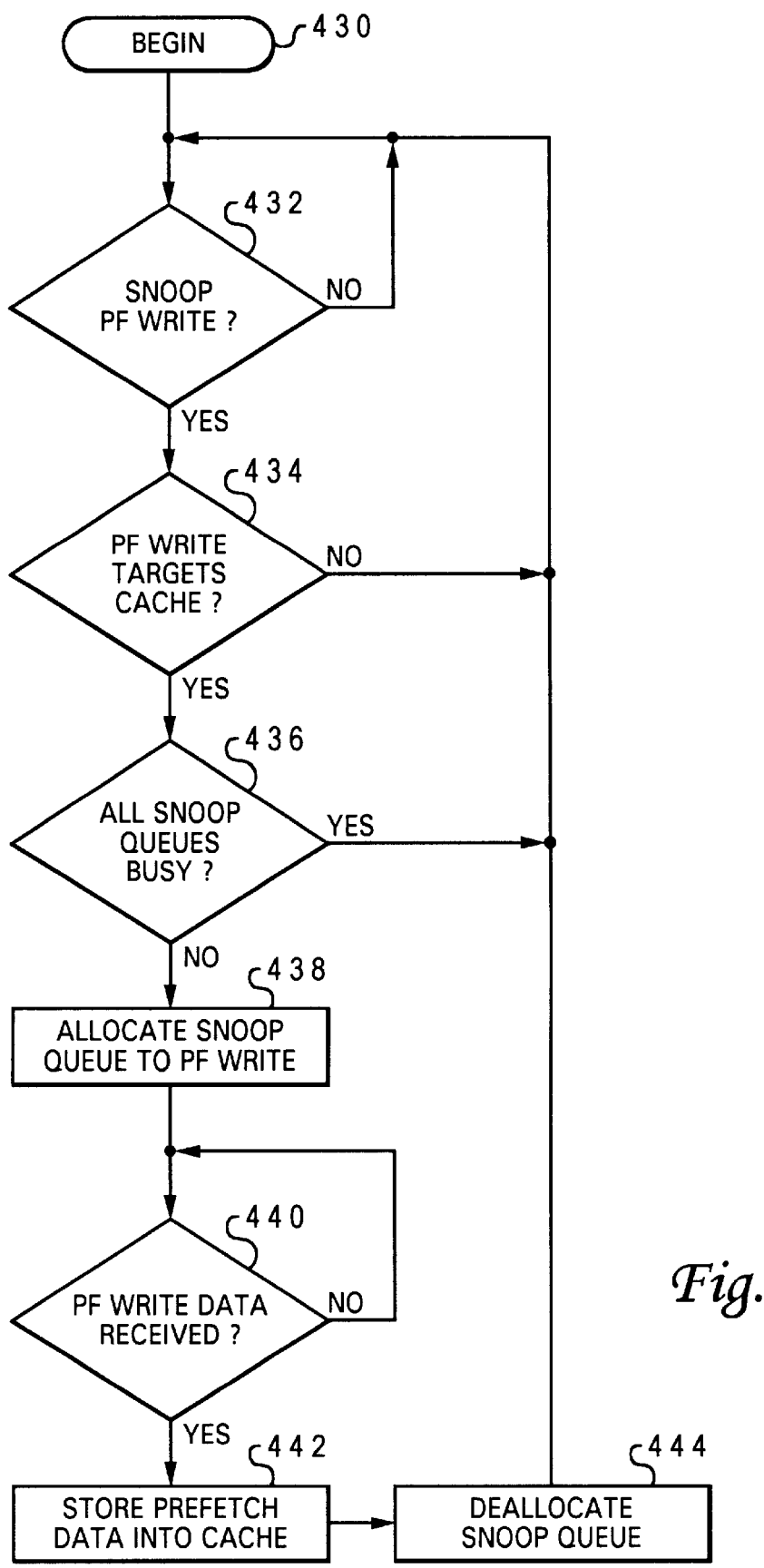

Referring now to FIG. 15C, there is illustrated a high level logical flowchart of an exemplary method by which a requesting cache handles a snooped prefetch WRITE operation in accordance with the present invention. As shown, the process begins at block 430 and thereafter iterates at block 432 until a lowest level cache 132 within one of cache hierarchies 62 snoops a prefetch WRITE operation on its local interconnect 58. In response to snooping a prefetch WRITE operation on local interconnect 58, cache controller 156 of cache 132 examines the destination tag filed 242 of the prefetch WRITE operation to determine whether or not it is a target of the prefetch WRITE operation. If not, the process terminates and returns to block 432.

Returning to block 434, if the destination tag field 242 indicates that cache 132 is the target of the snooped prefetch WRITE operation, cache controller 156 determines whether or not one of its snoop queues 135 (see FIG. 4) is available for allocation to the prefetch WRITE operation. If all of snoop queues 135 that may be assigned to prefetch WRITE operations are busy, the process terminates and returns to block 432, indicating that cache controller 156 does not accept the prefetch data or issue a Retry snoop response if no snoop queue 135 is available. However, if one of snoop queues 135 is available for allocation to the prefetch WRITE operation, cache controller 156 allocates one of snoop queues 135 to the prefetch WRITE operation, as shown at block 438, and then awaits delivery of the cache line of prefetch data, as illustrated at block 440. Then, in response to receipt of the cache line of prefetch data, cache controller 156 stores the prefetch data into data storage 130 and updates cache directory 140 appropriately. Thereafter, cache controller 156 deallocates the snoop queue 135 allocated to the prefetch WRITE operation, and the process returns to block 432, which has been described.

The method of prefetching illustrated in FIGS. 15A–15C provides a number of advantages over the prior art. First, the prefetch methodology of the present invention reduces overall system queue expense by eliminating prefetch read queues in the requesting processing unit. The concomitant addition of memory controller queues to handle prefetch WRITE operations is generally less costly and requires fewer queues than providing queues in every lower level cache. Second, because prefetching is implemented with imprecise operations, if either the memory controller or the cache controller is busy, prefetch hints can safely be ignored. As a result, bus traffic due to prefetch operations being reissued in response to Retry responses is eliminated. Third, in the present invention queues are more efficiently utilized because the requesting cache controller's snoop queues allocated to service the prefetch WRITE operations are busy for a much shorter duration than the prefetch read queues employed in the prior art. In other words, unlike the prefetch read queues of the prior art, which must stay active from issuance of the prefetch READ request until receipt of the requested prefetch data from system memory, in the present invention a cache controller's snoop queue does not get allocated until a prefetch WRITE operation is snooped.

CONCLUSION

As has been described, the present invention provides a NUMA computer system and method of operation having improved data storage, queuing and communication efficiency. While the invention has been particularly shown and described with reference to a preferred embodiment, it will be understood by those skilled in the art that various changes in form and detail may be made therein without departing from the spirit and scope of the invention. For example, although a number of enhancements to a NUMA architecture have been presented herein in combination, it should be appreciated that the enhancements may each be implemented independently or in subcombinations.

What is claimed is:

1. A computer system, comprising:
    a processing unit including one or more first queues for queuing memory access operations;
    a system memory; and
    a memory controller coupled to the processing unit and the system memory, said memory controller including one or more second queues for queuing memory access operations, wherein the memory controller, responsive to a prefetch access queued within one of said second queues, accesses said system memory to obtain prefetch data and, in a prefetch write operation initiated by the memory controller that specifies said processing unit in a destination field, transmits said prefetch data to the processing unit, wherein, of said processing unit and said memory controller, only said memory controller allocates a queue to said prefetch access prior to receipt by said processing unit of said prefetch write operation.

2. The computer system of claim 1, wherein said memory controller transmits said prefetch write operation in response to receipt of a prefetch hint from the processing unit.

3. The computer system of claim 2, wherein said processing unit transmits said prefetch hint to said memory controller with a read-type request.

4. The computer system of claim 3, wherein said processing unit allocates a queue among said first queues to said read-type request and no queue to said prefetch hint.

5. The computer system of claim 2, wherein said memory controller transmits said prefetch write operation in response to said prefetch hint only if a prefetch queue is available among said second queues and ignores said prefetch hint otherwise.

6. The computer system of claim 1, wherein said processing unit ignores said prefetch write operation if no snoop queue among said first queues is available.

7. The computer system of claim 1, wherein said computer system comprises a non-uniform memory access (NUMA) computer system including a remote node containing said processing unit, a home node containing said memory controller and said system memory, and a node interconnect coupling said home node and said remote node.

8. The computer system of claim 1, wherein said memory controller communicates with said processing unit utilizing a protocol in which a transaction descriptor distinguishes transmissions belonging to read operations from transmissions belonging to write operations, and wherein said prefetch write operation is identified by a transaction descriptor within the prefetch write operation as a write-type operation.

9. A memory controller for a computer system including a processing unit and a system memory, wherein said processor includes one or more queues for queuing memory access operations, said memory controller comprising:
    one or more queues for queuing memory access operations;
    means, responsive to a prefetch access queued within one of said queues, for accessing the system memory to obtain prefetch data; and
    means for transmitting prefetch data obtained from the system memory to the processing unit in a prefetch write operation specifying the processing unit in a destination field, wherein, of the processing unit and said memory controller, only said memory controller allocates a queue to said prefetch access prior to receipt by the processing unit of said prefetch write operation.

10. The memory controller of claim 9, wherein said memory controller transmits said prefetch write operation in response to receipt of a prefetch hint from the processing unit.

11. The memory controller of claim 10, wherein said memory controller transmits said prefetch write operation in response to receipt of a prefetch hint received from the processing unit with a read-type request.

12. The memory controller of claim 11, wherein said memory controller transmits said prefetch write operation in response to said prefetch hint only if a prefetch queue is available among said one or more queues and ignores said prefetch hint otherwise.

13. A node of a non-uniform memory access (NUMA) computer system, comprising:
    a memory controller according to claim 9;
    the system memory coupled to the memory controller; and
    a node controller, coupled to the memory controller, that interfaces the node to a node interconnect.

14. The memory controller of claim 9, wherein said memory controller communicates with said processing unit utilizing a protocol in which a transaction descriptor distinguishes transmissions belonging to read operations from transmissions belonging to write operations, and wherein said prefetch write operation is identified by a transaction descriptor within the prefetch write operation as a write-type operation.

15. A method of operating a data processing system, said method comprising:
    queuing a prefetch access at a memory controller;
    in response to the queued prefetch access, the memory controller accessing a system memory to obtain prefetch data; and
    the memory controller transmitting said prefetch data to a processing unit in a prefetch write operation specifying the processing unit in a destination field, wherein, of the processing unit and said memory controller, only said memory controller allocates a queue to said prefetch access prior to receipt by the processing unit of said prefetch write operation.

16. The method of claim 15, wherein said transmitting comprises transmitting said prefetch write operation in response to receipt of a prefetch hint from the processing unit.

17. The method of claim 15, and further comprising the processing unit transmitting said prefetch hint to said memory controller with a read-type request.

18. The method of claim 17, wherein said processing unit includes a plurality of queues, said method further comprising allocating a queue among said plurality of queues to said read-type request and no queue to said prefetch hint.

19. The method of claim 17, wherein said transmitting comprises transmitting said prefetch write operation in response to said prefetch hint only if a prefetch queue is available among said one or more queues and ignoring said prefetch hint otherwise.

20. The method of claim 15, wherein said processing unit includes a plurality of snoop queues, said method further comprising the processing unit ignoring said prefetch write operation if no snoop queue among said plurality of snoop queues is available.

21. The method of claim 15, wherein said data processing system comprises a non-uniform memory access (NUMA) computer system including a remote node containing said processing unit, a home node containing said memory controller and said system memory, and a node interconnect coupling said home node and said remote node, and wherein said transmitting comprises transmitting said prefetch write operation via said node interconnect.

22. The method of claim 15, wherein said memory controller communicates with said processing unit utilizing a protocol in which a transaction descriptor distinguishes transmissions belonging to read operations from transmissions belonging to write operations, and wherein transmitting said prefetch data comprises transmitting said prefetch data in a write operation identified by a transaction descriptor within the prefetch write operation as a write-type operation.

* * * * *